US011593983B2

(12) United States Patent
Zhang et al.

(10) Patent No.: US 11,593,983 B2
(45) Date of Patent: Feb. 28, 2023

(54) IMAGE PROCESSING METHOD AND APPARATUS, ELECTRONIC DEVICE, AND STORAGE MEDIUM

(71) Applicant: Beijing Bytedance Network Technology Co., Ltd., Beijing (CN)

(72) Inventors: Shupeng Zhang, Beijing (CN); Tang Tang, Beijing (CN); Hui Yang, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/672,446

(22) Filed: Feb. 15, 2022

(65) Prior Publication Data

US 2022/0172418 A1 Jun. 2, 2022

Related U.S. Application Data

(63) Continuation of application No. PCT/CN2020/122832, filed on Oct. 22, 2020.

(30) Foreign Application Priority Data

Nov. 1, 2019 (CN) .......................... 201911060495.6

(51) Int. Cl.
*G06T 13/40* (2011.01)
*G06V 40/10* (2022.01)
(Continued)

(52) U.S. Cl.
CPC ............... *G06T 13/40* (2013.01); *G06T 3/40* (2013.01); *G06T 19/20* (2013.01); *G06V 40/10* (2022.01);
(Continued)

(58) Field of Classification Search
CPC .......... G06T 13/40; G06T 3/40; G06T 19/20; G06T 13/80; G06V 40/10; G06V 40/20; G06V 2201/07; G06K 9/00
See application file for complete search history.

(56) References Cited

U.S. PATENT DOCUMENTS

2018/0189945 A1 7/2018 Zhao et al.
2019/0287288 A1 9/2019 Guay et al.

FOREIGN PATENT DOCUMENTS

CN 101833459 A 9/2010
CN 102509333 A 6/2012
(Continued)

OTHER PUBLICATIONS

Agarwala, A., Hertzmann, A., Salesin, D.H. and Seitz, S.M., 2004. Keyframe-based tracking for rotoscoping and animation. ACM Transactions on Graphics (ToG), 23(3), pp. 584-591.*
(Continued)

*Primary Examiner* — Zhitong Chen
(74) *Attorney, Agent, or Firm* — ArentFox Schiff LLP

(57) ABSTRACT

Embodiments of the present disclosure provide an image processing method and apparatus, an electronic device, and a storage medium; the method includes: collecting a first frame image containing a target object; detecting key points of the target object in the first frame image to obtain first position information of the key points; generating and presenting a cartoon character in the same form as the target object based on the first position information of the key points; collecting a second frame image containing the target object, where the first frame image and the second frame image are consecutive frame images; detecting key points of the target object in the second frame image to obtain second position information of the key points; and updating a form of the presented cartoon character based on a difference between the first position information and the second position information.

19 Claims, 17 Drawing Sheets

(51) Int. Cl.
   *G06V 40/20*   (2022.01)
   *G06T 3/40*    (2006.01)
   *G06T 19/20*   (2011.01)

(52) U.S. Cl.
   CPC .......... *G06V 40/20* (2022.01); *G06V 2201/07* (2022.01)

(56) References Cited

FOREIGN PATENT DOCUMENTS

| | | | | | |
|---|---|---|---|---|---|
| CN | 102682420 | A | * | 9/2012 | ............... G06T 3/00 |
| CN | 102682420 | A | | 9/2012 | |
| CN | 104616331 | A | | 5/2015 | |
| CN | 109191548 | A | * | 1/2019 | ............. G06T 13/40 |
| CN | 109191548 | A | | 1/2019 | |
| CN | 109215102 | A | * | 1/2019 | ............. G06T 13/40 |
| CN | 109215102 | A | | 1/2019 | |
| CN | 109308682 | A | | 2/2019 | |
| CN | 109727303 | A | | 5/2019 | |
| CN | 110047102 | A | | 7/2019 | |
| CN | 110058685 | A | | 7/2019 | |
| CN | 110335331 | A | | 10/2019 | |

OTHER PUBLICATIONS

International Search Report and Written Opinion for Interntational Patent Application No. PCT/CN2020/122832, dated Jan. 22, 2021 (7 pages).

Office Action for Chinese Patent Application No. 201911060495.6, dated Dec. 20, 2022 (13 pages).

* cited by examiner

** IMAGE PROCESSING METHOD AND APPARATUS, ELECTRONIC DEVICE, AND STORAGE MEDIUM

CROSS-REFERENCE TO RELATED APPLICATION

This application is a continuation of International Application No. PCT/CN2020/122832, filed on Oct. 22, 2020, which claims priority to Chinese Patent Application No. 201911060495.6, filed with the China National Intellectual Property Administration on Nov. 1, 2019 and entitled "IMAGE PROCESSING METHOD AND APPARATUS, ELECTRONIC DEVICE, AND STORAGE MEDIUM". The above applications are incorporated herein by reference in their entireties.

TECHNICAL FIELD

Embodiments of the present disclosure relate to an image processing technology, and in particular, to an image processing method and apparatus, an electronic device, and a storage medium.

BACKGROUND

With the development of communication technology and terminal devices, various terminal devices such as mobile phones, tablet computers, etc. have become an indispensable part of people's work and life, and with the increasing popularity of terminal devices, interactive applications based on terminals have become a main channel of communication and entertainment. In related technologies, the interactive mode of interactive applications is single, which cannot meet diverse needs of users.

SUMMARY

The summary of the disclosure is provided to introduce concepts in a brief form, and these concepts will be described in detail in the following description of embodiments. The summary of the disclosure is neither intended to identify key features or essential features of the claimed technical solution, nor to be used to limit the scope of the claimed technical solution.

In a first aspect, an embodiment of the present disclosure provides an image processing method, including:

collecting a first frame image containing a target object;

detecting key points of the target object in the first frame image to obtain first position information of the key points;

generating and presenting a cartoon character in a same form as the target object based on the first position information of the key points;

collecting a second frame image containing the target object, where the first frame image and the second frame image are consecutive frame images;

detecting the key points of the target object in the second frame image to obtain second position information of the key points; and updating a form of the presented cartoon character based on a difference between the first position information and the second position information.

In the above solution, the generating the cartoon character in the same form as the target object based on the first position information of the key points includes:

loading a cartoon material, where the cartoon material includes at least one of a head material, a body material, and an apparel material of the cartoon character;

determining position information of head key points and body key points of the cartoon character based on the first position information of the key points; and generating the cartoon character in the same form as the target object based on the position information of the head key points and the body key points of the cartoon character, and the cartoon material.

In the above solution, the generating the cartoon character in the same form as the target object based on the position information of the head key points and the body key points of the cartoon character, and the cartoon material includes:

when the cartoon material includes the head material and the body material of the cartoon character, combining the head material and the body material according to the position information of the head key points and the body key points of the cartoon character to obtain the cartoon character.

In the above solution, the generating the cartoon character in the same form as the target object based on the first position information of the key points includes:

determining position information of head key points and body key points of the cartoon character based on the first position information of the key points;

drawing a head of the cartoon character in a form of lines based on the position information of the head key points of the cartoon character;

drawing a body of the cartoon character in the form of lines based on the position information of the body key points of the cartoon character; and combining the drawn head and body of the cartoon character to obtain the cartoon character in the same form as the target object.

In the above solution, the drawing the body of the cartoon character in the form of lines includes:

when it is determined based on positions of the body key points of the cartoon character that the body key points are not in a straight line, connecting the body key points through an arc to obtain a body in a form of an arc-shaped line whose body bending degree matches a body bending degree of the target object.

In the above solution, the presenting the cartoon character in the same form as the target object includes:

determining a relative positional relationship between the cartoon character and the target object when the cartoon character and the target object are presented in a graphical interface; and presenting the target object and the cartoon character through a same window based on the relative position relationship.

In the above solution, the presenting the cartoon character in the same form as the target object includes:

respectively determining windows corresponding to the cartoon character and the target object when the cartoon character and the target object are presented in a graphical interface, where the cartoon character and the target object correspond to different windows; and respectively presenting the cartoon character and the target object through a main window and a sub-window.

In the above solution, the updating the form of the presented cartoon character based on the difference between the first position information and the second position information includes:

determining a position change of the key points of the cartoon character based on the difference between the first position information and the second position information; and adjusting the form of the presented cartoon character based on the position change of the key points of the cartoon character, so that the updated form of the cartoon character is as same as a form of the target object in the second frame image.

In a second aspect, an embodiment of the present disclosure provides an image processing apparatus, including:

a first collecting unit, configured to collect a first frame image containing a target object;

a first detecting unit, configured to detect key points of the target object in the first frame image to obtain first position information of the key points;

a processing unit, configured to generate and present a cartoon character in a same form as the target object based on the first position information of the key points;

a second collecting unit, configured to collect a second frame image containing the target object, where the first frame image and the second frame image are consecutive frame images;

a second detecting unit, configured to detect the key points of the target object in the second frame image to obtain second position information of the key points; and an updating unit which updates a form of the presented cartoon character based on a difference between the first position information and the second position information.

In the above solution, the processing unit is further configured to:

load a cartoon material, where the cartoon material includes at least one of a head material, a body material, and an apparel material of the cartoon character;

determine position information of head key points and body key points of the cartoon character based on the first position information of the key points; and generate the cartoon character in the same form as the target object based on the position information of the head key points and the body key points of the cartoon character, and the cartoon material.

In the above solution, the processing unit is further configured to combine the head material and the body material according to the position information of the head key points and the body key points of the cartoon character to obtain the cartoon character, when the cartoon material includes the head material and the body material of the cartoon character.

In the above solution, the processing unit is further configured to:

when the cartoon material includes the head material of the cartoon character, draw body of the cartoon character in a form of lines based on the position information of the body key points of the cartoon character; and combine the head material and the drawn body of the cartoon character to obtain the cartoon character in the same form as the target object.

In the above solution, the processing unit is further configured to:

determine position information of head key points and body key points of the cartoon character based on the first position information of the key points;

draw a head of the cartoon character in a form of lines based on the position information of the head key points of the cartoon character;

draw a body of the cartoon character in the form of lines based on the position information of the body key points of the cartoon character; and combine the drawn head and body of the cartoon character to obtain the cartoon character in the same form as the target object.

In the above solution, the processing unit is further configured to connect the body key points through an arc to obtain a body in a form of an arc-shaped line whose body bending degree matches a body bending degree of the target object, when it is determined based on positions of the body key points of the cartoon character that the body key points are not in a straight line.

In the above solution, the processing unit is further configured to:

determine a relative positional relationship between the cartoon character and the target object when the cartoon character and the target object are presented in a graphical interface; and present the target object and the cartoon character through a same window based on the relative position relationship.

In the above solution, the processing unit is further configured to:

respectively determine windows corresponding to the cartoon character and the target object when the cartoon character and the target object are presented in a graphical interface, where the cartoon character and the target object correspond to different windows; and respectively present the cartoon character and the target object through a main window and a sub-window.

In the above solution, the updating unit is further configured to:

determine a position change of the key points of the cartoon character based on the difference between the first position information and the second position information; and adjust the form of the presented cartoon character based on the position change of the key points of the cartoon character, so that the updated form of the cartoon character is as same as a form of the target object in the second frame image.

In a third aspect, an embodiment of the present disclosure provides an electronic device, including:

a memory, configured to store executable instructions; and a processor, configured to implement the image processing method provided in the embodiments of the present disclosure when executing the executable instruction.

In a fourth aspect, an embodiment of the present disclosure provides a storage medium with executable instructions stored thereon, the executable instructions are configured to implement the image processing method provided by the embodiments of the present disclosure when executed.

In a fifth aspect, an embodiment of the present disclosure provides a computer program product including a computer program, the computer program is configured to implement the image processing method provided by the embodiments of the present disclosure when executed.

The embodiments of the present disclosure have the following beneficial advantages:

by applying the above embodiments of the present disclosure, first position information of key points is obtained by detecting the key points of a target object in a first frame image; a cartoon character in the same form as the target object is generated and presented based on the first position information of the key points; and second position information of the key points is obtained by detecting the key points of the target object in the second frame image; and then a form of the present cartoon character is updated based on a difference between the first position information and the second position information, thus causing the generated cartoon character to follow the target object to perform the same action as the target object in the collected image during a video shooting process, thereby providing a user with a new interactive mode and improving the user's sense of experience.

BRIEF DESCRIPTION OF DRAWINGS

The above and other features, advantages, and aspects of the embodiments of the present disclosure will become more apparent in conjunction with the accompanying drawings and with reference to the following description of embodiments. Throughout the drawings, the same or similar reference signs indicate the same or similar elements. It should be understood that the drawings are schematic, and the components and elements are not always drawn to scale.

DESCRIPTION OF EMBODIMENTS

Figure 1:
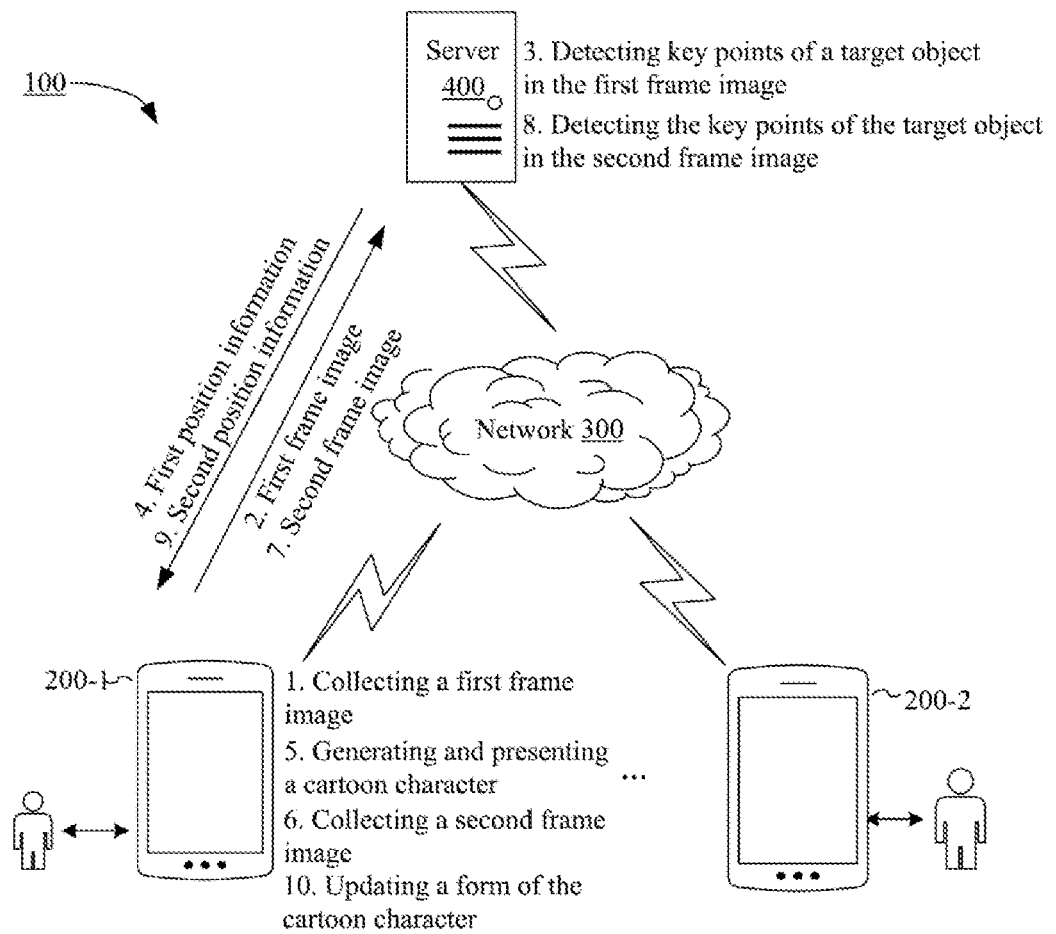
FIG. 1 is a schematic diagram of an optional architecture of an image processing system 100 provided by an embodiment of the present disclosure.

Hereinafter, the embodiments of the present disclosure will be described in more detail with reference to the drawings. Although some embodiments of the present disclosure are shown in the drawings, it should be understood that the present disclosure may be implemented in various forms, and should not be construed as being limited to the embodiments set forth herein, on the contrary, these embodiments are provided for a more thorough and complete understanding of the present disclosure. It should be understood that the drawings and embodiments of the present disclosure are only used for exemplary purposes, and are not used to limit the protection scope of the present disclosure.

It should be understood that various steps recorded in the implementation manners of the method of the present disclosure may be executed in a different order, and/or executed in parallel. Additionally, the implementation manners of the method may include additional steps and/or may omit the illustrated steps. The scope of the present disclosure is not limited in this aspect.

The term "include" and its variants as used herein are open-label includes, that is, "include but not limited to". The term "based on" is "based at least in part on". The term "an embodiment" means "at least one embodiment"; the term "another embodiment" means "at least another embodiment"; the term "some embodiments" means "at least some embodiments". Related definitions of other terms will be given in the following description.

It should be noted that the concepts of "first", "second", etc. mentioned in the present disclosure are only used to distinguish different apparatuses, modules, or units, and are not used to limit the order or interdependence of functions performed by these apparatuses, modules or units.

It should be noted that the modifications of "a" and "a plurality of" mentioned in the present disclosure are illustrative and not restrictive, and those skilled in the art should understand that unless the context clearly indicates otherwise, it should be understood as "one or a plurality of".

Names of messages or information interacted among multiple apparatuses in the embodiments of the present disclosure are only used for illustrative purposes, and are not used to limit the scope of these messages or information.

Referring to FIG. 1, which is a schematic diagram of an optional architecture of an image processing system 100 provided by an embodiment of the present disclosure, in order to accomplish supporting an exemplary application, a terminal 200 (including a terminal 200-1 and a terminal 200-2), a terminal 200 is connected to a server 400 through a network 300, and the network 300, which may be a wide area network or a local area network, or a combination of the two, uses wireless links to accomplish data transmission.

The terminal 200 is configured to collect a first frame image containing a target object, and send the first frame image to the server 400;

the server 400 is configured to detect key points of the target object in the first frame image to obtain first position information of the key points, and send the first position information of the key points to the terminal 200;

the terminal 200 is further configured to generate and present a cartoon character in a same form as the target object based on the first position information of the key points; collect a second frame image containing the target object, and send the second frame image to the server 400, where the first frame image and the second frame image are consecutive frame images;

the server 400 is further configured to detect the key points of the target object in the second frame image to obtain second position information of the key points, and send the second position information of the key points to the terminal 200; and the terminal 200 is further configured to update a form of the presented cartoon character based on a difference between the first position information and the second position information.

In practical applications, the server 200 may be either a server that is independently configured to support various services, or may be configured as a server cluster; the terminal may be various types of user terminals such as a smart phone, a tablet computer, a notebook computer, etc., and may also be a wearable computing device, a personal digital assistant (PDA), a desktop computer, a cellular phone, a media player, a navigation device, a game console, a television set, or a combination of any two or more of these or other data processing devices.

An electronic device implementing the image processing method of the embodiments of the present disclosure will be described below. In some embodiments, the electronic device may be implemented in various forms, such as: independently implemented by the terminal such as a smart phone, a tablet computer, and a desktop computer, or implemented collaboratively by the terminal and the server.

Figure 2:
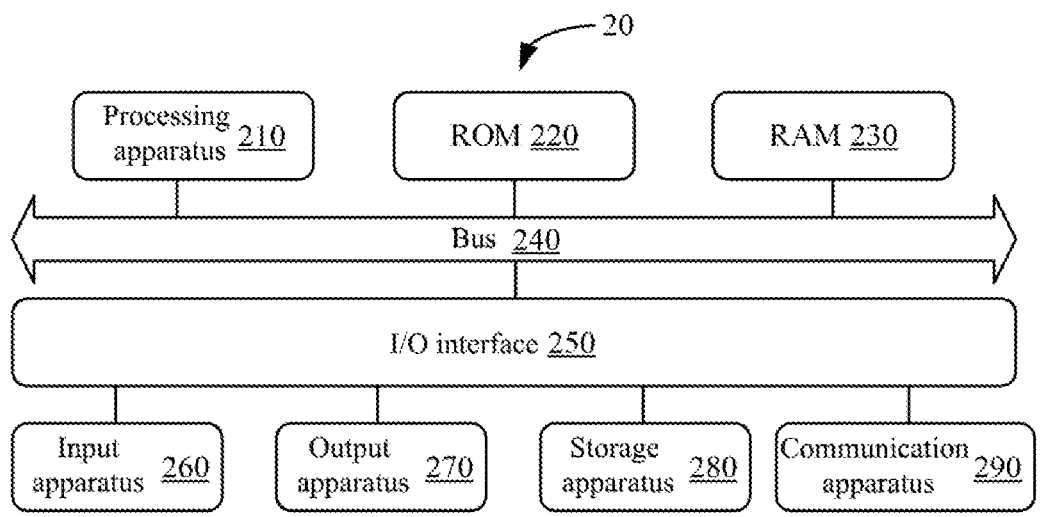
FIG. 2 is a structural schematic diagram of an electronic device 20 provided by an embodiment of the present disclosure.

Referring to FIG. 2 below, which is a structural schematic diagram of an electronic device 20 provided by an embodiment of the present disclosure. An electronic device illustrated in FIG. 2 is only an example, and should not impose any limitation on the function and range of use of the embodiments of the present disclosure.

As illustrated in FIG. 2, the electronic device 20 may include a processing apparatus 210 (e.g., a central processing unit, a graphic processor, etc.), which may execute various appropriate actions and processing according to a program stored in a read-only memory 220 (ROM) or a program loaded from a storage apparatus 280 to a random access memory 230 (RAM). Various programs and data necessary for operations of the electronic device 20 are also stored in the RAM 230. The processing apparatus 210, the ROM 220, and the RAM 230 are connected to each other through a bus 240. An input/output (I/O) interface 250 is also connected to the bus 240.

Generally, the following apparatuses may be connected to the I/O interface 250: including an input apparatus 260, for example, a touch screen, a touch pad, a keyboard, a mouse, a camera, a microphone, an accelerometer, a gyroscope, etc.; including an output apparatus 270, for example, a liquid crystal display (LCD), a speaker, a vibrator, etc.; including a storage apparatus 280, for example, a magnetic tape, a hard disk, etc.; and a communication apparatus 290. The communication apparatus 290 may allow the electronic device 20 to communicate with other devices in a wireless or wired manner to exchange data. Although FIG. 2 illustrates the electronic device 20 with various apparatuses, it should be understood that not all of the illustrated apparatuses are required to be implemented or possessed. More or fewer apparatuses may be alternatively implemented or possessed.

In particular, processes described by the provided flowcharts according to the embodiments of the present disclosure may be implemented as computer software programs. For example, the embodiments of the present disclosure include a computer program product, which includes a computer program carried on a computer-readable medium, where the computer program embodies a program code for executing the method illustrated in the flowchart. In such an embodiment, the computer program may be downloaded and installed from the network through the communication apparatus 290, or installed from the storage apparatus 280, or installed from the ROM 220. When the computer program is executed by the processing apparatus 210, the functions in the image processing method of the embodiments of the present disclosure are executed.

It should be noted that, the computer-readable medium described above in the embodiments of the present disclosure may be a computer-readable signal medium or a computer-readable storage medium, or any combination of the foregoing two. The computer-readable storage medium may include, but is not limited to, for example, an electrical, magnetic, optical, electromagnetic, infrared, or semiconductor system, apparatus, or device, or any combination thereof. More specific examples of the computer-readable storage medium may include, but are not limited to: an electrical connection with one or more wires, a portable computer disk, a hard disk, an RAM, an ROM, an erasable programmable read only memory (EPROM), a flash memory, a fiber optic, a portable compact disk read-only memory (CD-ROM), an optical storage means, a magnetic storage means, or any suitable combination of the foregoing.

In the embodiments of the present disclosure, a computer-readable storage medium may be any tangible medium that contains or stores a program, which may be used by or in conjunction with an instruction execution system, apparatus, or means. However, in the embodiments of the present disclosure, a computer-readable signal medium may include a data signal with a computer-readable program code embodied therein propagated in a baseband or as part of a carrier. Such a propagated signal may take various forms, including, but not limited to, an electro-magnetic signal, an optical signal, or any suitable combination thereof. A computer-readable signal medium may also be any computer readable medium that is not a computer-readable storage medium and that may send, propagate, or transmit a program for use by or in conjunction with an instruction execution system, apparatus, or means. The program code embodied on the computer-readable medium may be transmitted using any suitable medium, including an electrical wire, an optical fiber cable, radio frequency (RF), etc., or any suitable combination of the foregoing.

The above computer-readable medium may be embodied in the above electronic device 20; and may also exist alone without being assembled into the electronic device 20.

The above computer-readable medium carries one or more programs which, when executed by the electronic device 20, cause the electronic device 20 to execute the image processing method provided by an embodiment of the present disclosure.

The computer program code for implementing operations in the embodiments of the present disclosure may be written in one or more programming languages or the combination thereof, including object-oriented programming languages—such as Java, Smalltalk, C++, and conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet Service Provider).

The flowcharts and block diagrams provided by an embodiment of the present disclosure illustrate the architecture, functionality, and operations of possible implementations of systems, methods, and computer program products according to various embodiments of the present disclosure. In this regard, each block in the flowchart or block diagrams may represent a module, a program segment, or a portion of code, which includes one or more executable instructions for implementing the specified logical functions. It should also be noted that, in some alternative implementations, the functions noted in the blocks may occur out of the order noted in the drawing. For example, two blocks shown in succession may, in fact, be executed substantially in parallel, or the blocks may also sometimes be executed in the reverse order, depending on the functions involved. It is also noted that each block in the block diagrams and/or flowcharts, and a combination of the blocks may be implemented by a dedicated hardware-based system for performing specified functions or operations, or by a combination of dedicated hardware and computer instructions.

The involved units described in the embodiments of the present disclosure may be implemented in a software manner, and may also be implemented in a hardware manner. Where the name of the unit does not constitute a limitation of the unit itself in some cases, for example, a first collecting unit may also be described as "collecting a first frame image containing a target object".

The functions described in the embodiments of the present disclosure may be executed, at least in part, by one or more hardware logic components. For example, unrestrictedly, exemplary types of hardware logic components that may be used include: a field-programmable gate array (FPGA), an application specific integrated circuit (ASIC), an application specific standard product (ASSP), a system on chip (SOC), a complex programmable logic device (CPLD) and so on.

In the context of the embodiments of the present disclosure, a computer-readable storage medium may be a tangible medium that may contain or store a program for use by or in connection with an instruction execution system, apparatus, or device. A machine-readable medium may be a machine-readable signal medium or a machine-readable storage medium. The machine-readable storage media may include, but is not limited to, for example, an electrical, magnetic, optical, electromagnetic, infrared, or semiconductor system, apparatus, or device, or any suitable combination of the foregoing. More specific examples of machine-readable storage medium may include, but are not limited to an electrical connection with one or more wires, a portable computer disk, a hard disk, a random access memory (RAM), a read-only memory (ROM), an erasable programmable read only memory (EPROM or a flash memory), a fiber optic, a portable compact disk read-only memory (CD-ROM), an optical storage device, a magnetic storage device, or any suitable combination of the foregoing.

Figure 3:
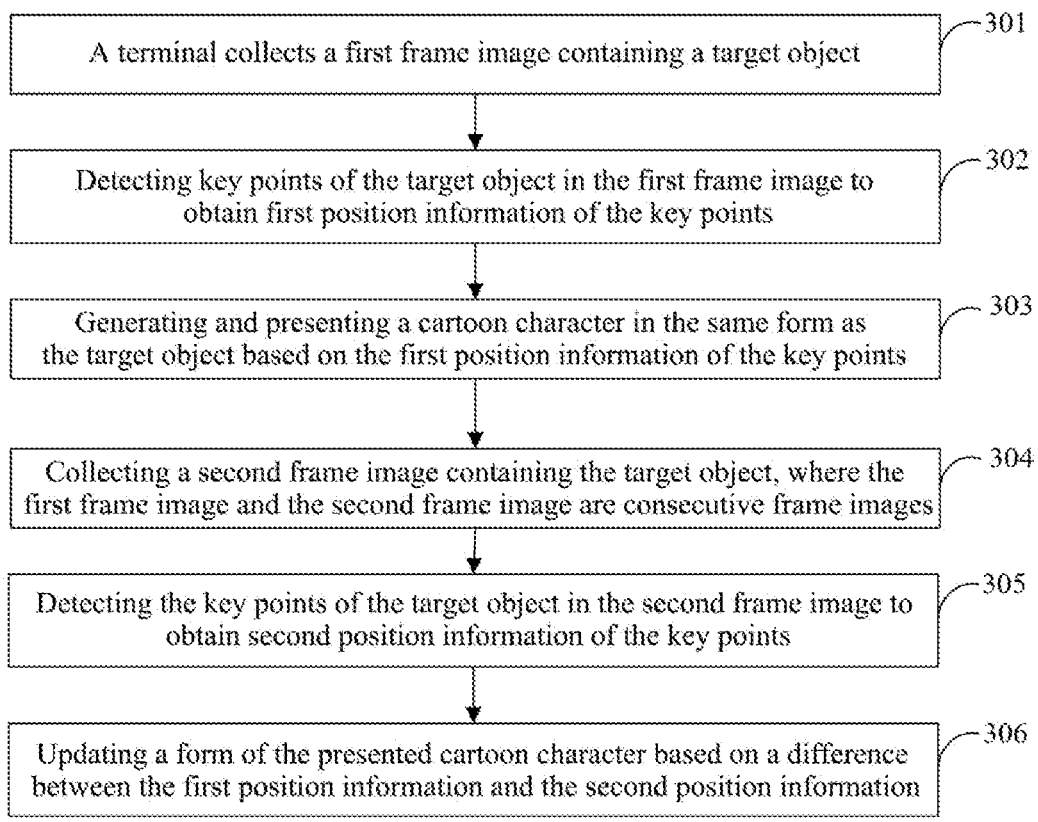
FIG. 3 is an optional flowchart of an image processing method provided by an embodiment of the present disclosure.

With continuing reference to FIG. 3 which is an optional flowchart of an image processing method provided by an embodiment of the present disclosure, the image processing method provided by the embodiment of the present disclosure includes:

Step 301: a terminal collects a first frame image containing a target object.

In practical applications, the terminal is provided with a client, such as an instant messaging client, a micro blog client, a short video client, etc., a user may click a video shooting button on a user interface of the client to trigger a video shooting instruction, so that the terminal invokes an image collection sensor, such as a camera, to collect the first frame image containing the target object. It should be stated that the target object of video shooting is the user who is being shot, and the number of users may be one or more.

Step 302: detecting key points of the target object in the first frame image to obtain first position information of the key points.

Figure 4:
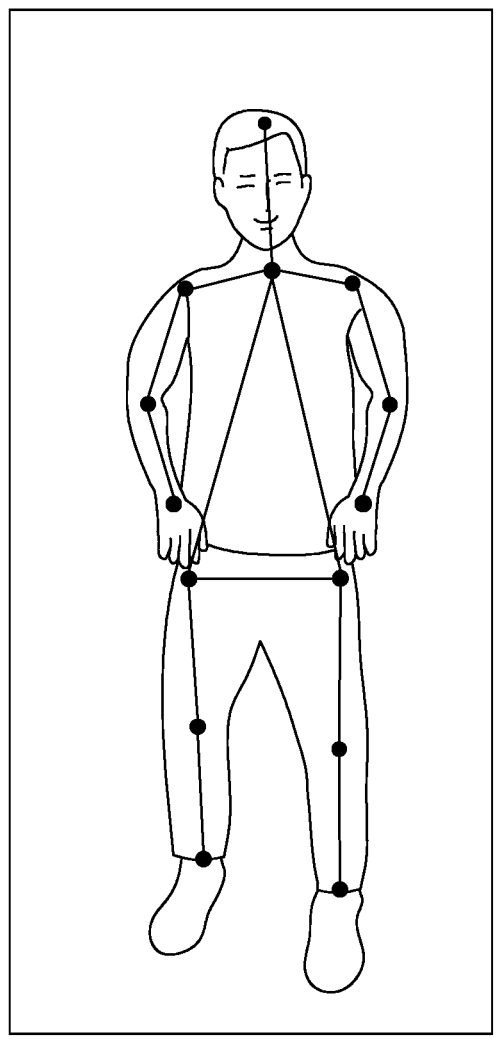
FIG. 4 is a schematic diagram of key points of a target object in a first frame image provided by an embodiment of the present disclosure.

In actual implementations, the key points of the target object may be various joint points of a person in the first frame image, such as a head, shoulders, elbows, wrists, etc. Referring to FIG. 4, which is a schematic diagram of key points of the target object in the first frame image provided by an embodiment of the present disclosure, the target object includes 14 key points in total, and a form of the target object may be determined through the key points.

In some embodiments, the terminal may detect the key points of the target object through a neural network model obtained by training (e.g., a convolutional neural network model (CNN)). In actual implementations, the terminal inputs the first frame image into the convolutional neural network model to obtain the first position information. Here, the first position information includes position information of each key point of the target object, and through establishment of a coordinate system in the first frame image, the position information of each key point is represented by coordinates.

Step 303: generating and presenting a cartoon character in the same form as the target object based on the first position information of the key points.

In actual implementations, since the form of the target object may be determined according to the first position information of the key points, a cartoon character in the same form as the target object may be generated based on the first position information of the key points, and the generated cartoon character may be presented.

In some embodiments, the terminal may generate the cartoon character in the same form as the target object in the following manner: loading a cartoon material, where the cartoon material includes at least one of a head material, a body material, and an apparel material of the cartoon character; determining position information of head key points and body key points of the cartoon character based on the first position information of the key points; and generating the cartoon character in the same form as the target object based on the position information of the head key points and the body key points of the cartoon character, and the cartoon material.

It should be stated that the head material is a head of the cartoon character, the body material includes limbs and a trunk of the cartoon character, and the clothing material includes clothes and shoes of the cartoon character. In actual implementations, the key points of the cartoon character and the key points of the target object are in a one-to-one correspondence, and the position information of the key points of the target object is determined based on the coordinate system corresponding to the first frame image, when generating the cartoon character, it is necessary to establish a coordinate system corresponding to the cartoon character, and determine the position information of the head key points and the body key points of the cartoon character based on the correspondence between the coordinate system of the first frame image and the coordinate system of the cartoon character.

In some embodiments, when the cartoon material includes the head material and the body material of the cartoon character, the terminal combines the head material and the body material according to the position information of the head key points and the body key points of the cartoon character to obtain the cartoon character.

Here the cartoon material includes the head material and the body material of the cartoon character, that is, each part of the body of the cartoon character has its corresponding material, and an entire cartoon character is constructed by combining the materials. In actual implementations, a position and a size of each material may be determined through the position information of the head key points and the body key points of the cartoon character, and then the head material and the body material may be combined according to the position of each material.

Figure 5:
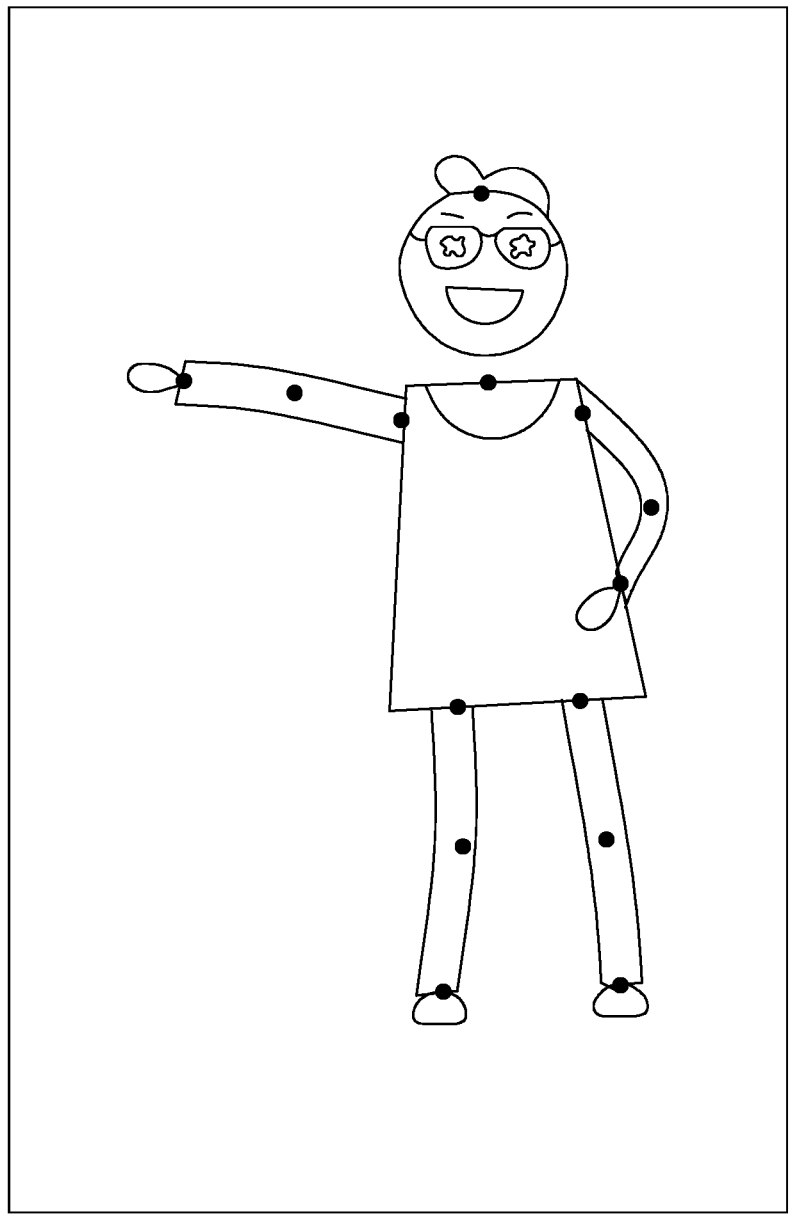
FIG. 5 is an optional schematic diagram of a cartoon character provided by an embodiment of the present disclosure.

For example, FIG. 5 is an optional schematic diagram of a cartoon character provided by an embodiment of the present disclosure. Referring to FIG. 5, the head and the body of the cartoon character are generated from the cartoon material, and the position of the cartoon material corresponds to positions of the key points of the cartoon characters.

When the loaded cartoon material cannot constitute an entire cartoon character, it is necessary to draw the part of the cartoon character lacking the cartoon material through lines.

In some embodiments, when the cartoon material includes the head material of the cartoon character, drawing body of the cartoon character in a form of lines based on the position information of the body key points of the cartoon character; and combining the head material with the drawn body of the cartoon character to obtain the cartoon character in the same form as the target object.

Here, since the cartoon material only includes the head material of the cartoon character and lacks the body of the cartoon character, it is necessary to draw the body of the cartoon character, that is, the trunk and limbs of the cartoon character, through lines.

In actual implementations, the body key points are divided into trunk key points and limbs key points of the cartoon character, and the trunk key points and the limbs key points of the cartoon character are respectively connected by lines. Among them, the body key points include: a left shoulder key point, a right shoulder key point, a left hip key point, and a right hip key point, connecting the body key points in sequence through lines to draw and obtain the trunk of the cartoon character; the limbs key points include: double upper limb key points and double lower limb key points, where each of the upper limb key points includes: a shoulder key point, an elbow key point, and a wrist key point; each of the lower limb key points includes: a hip key point, a knee key point, and an ankle key point, connecting the limbs key points through lines to draw the limbs of the cartoon character. For example, the left shoulder key point, the left elbow key point, and the left wrist key point are sequentially connected by lines to draw the left upper limb of the cartoon character.

Figure 6:
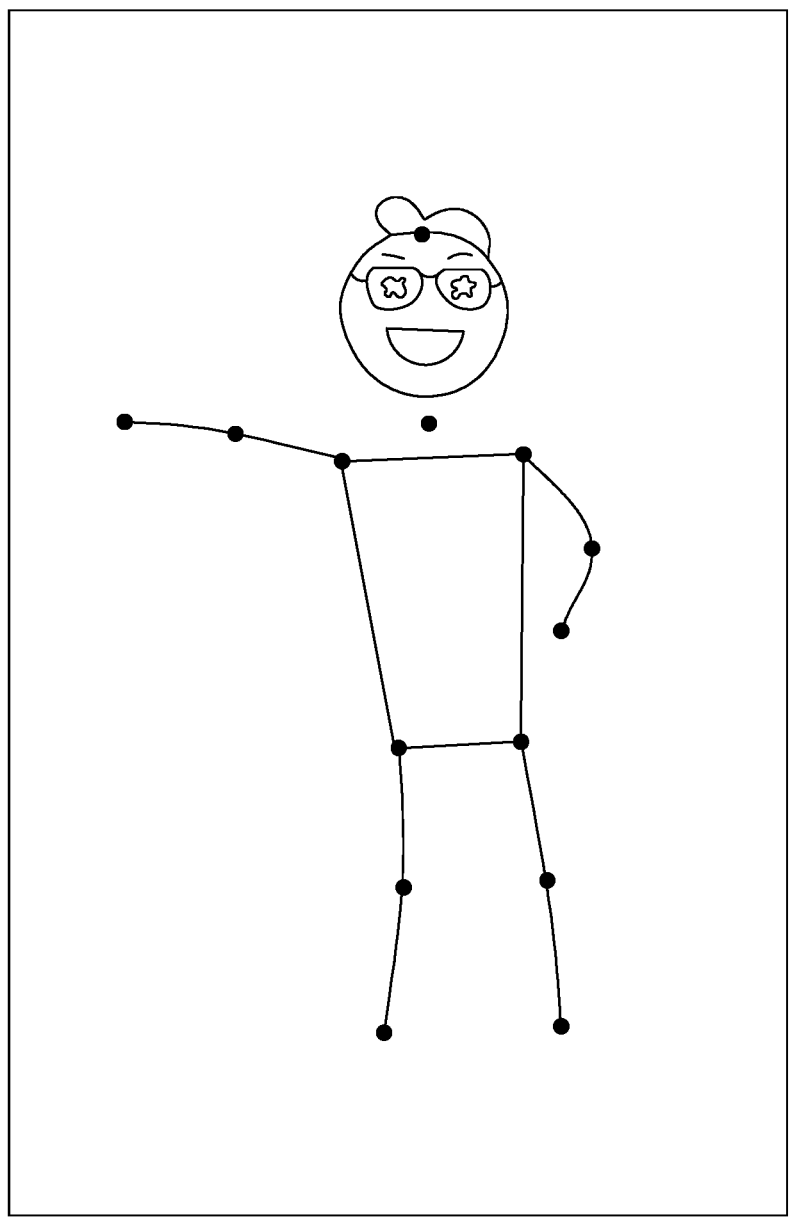
FIG. 6 is an optional schematic diagram of a cartoon character provided by an embodiment of the present disclosure.

For example, FIG. 6 is an optional schematic diagram of a cartoon character provided by an embodiment of the present disclosure. Referring to FIG. 6, the head of the cartoon character is a cartoon material, the body of the cartoon character is composed of lines, and the position of the head material corresponds to the position of the head key points, and the body of the cartoon character is obtained by connecting the body key points with lines.

In some embodiments, when the cartoon material includes the head and apparel materials of the cartoon character, due to lack of limbs of the cartoon character, drawing the limbs of the cartoon character in the form of lines based on the position information of the limbs key points of the cartoon character, and combining the head and apparel materials with the drawn limbs of the cartoon character to obtain the cartoon character in the same form as the target object.

Figure 7:
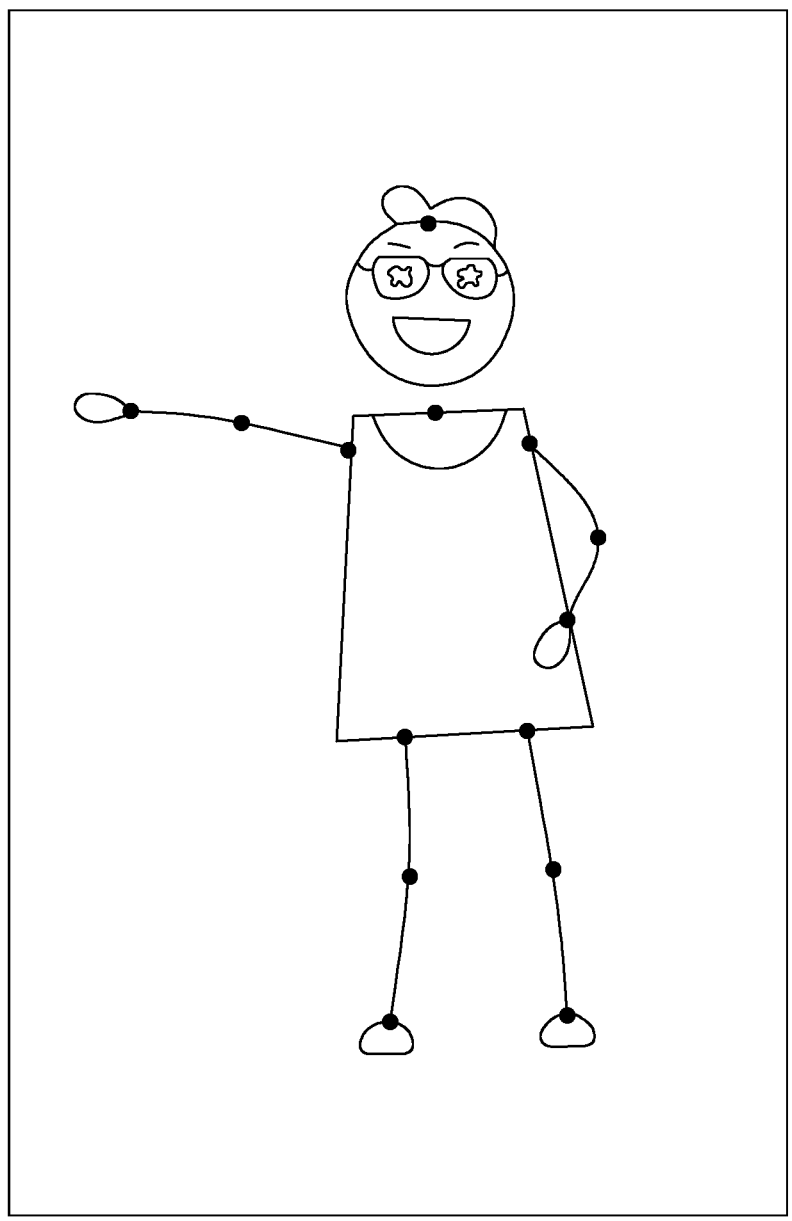
FIG. 7 is an optional schematic diagram of a cartoon character provided by an embodiment of the present disclosure.

For example, FIG. 7 is an optional schematic diagram of a cartoon character provided by an embodiment of the present disclosure. Referring to FIG. 7, the head, clothes, and shoes of the cartoon character are loaded materials, while the limbs are consisted of lines.

In some embodiments, the terminal may generate the cartoon character in the same form as the target object in the following manner: determining position information of the head key points and the body key points of the cartoon character based on the first position information of the key points; drawing a head of the cartoon character in the form of lines based on the position information of the head key points of the cartoon character; drawing a body of the cartoon character in the form of lines based on the position information of the body key points of the cartoon character; and combining the drawn head and body of the cartoon character to obtain the cartoon character in the same form as the target object.

Here, when no cartoon material is loaded, the entire cartoon character is drawn through lines. In actual implementations, determining the position of the head cartoon character based on the position information of the head key points of the cartoon character, and drawing the head of the cartoon character by virtue of a circular line at a position corresponding to the head of the cartoon character. The body key points are divided into trunk key points and limbs key points, and the trunk key points and the limbs key points of the cartoon character are respectively connected by lines to draw the trunk and limbs of the cartoon character.

Figure 8:
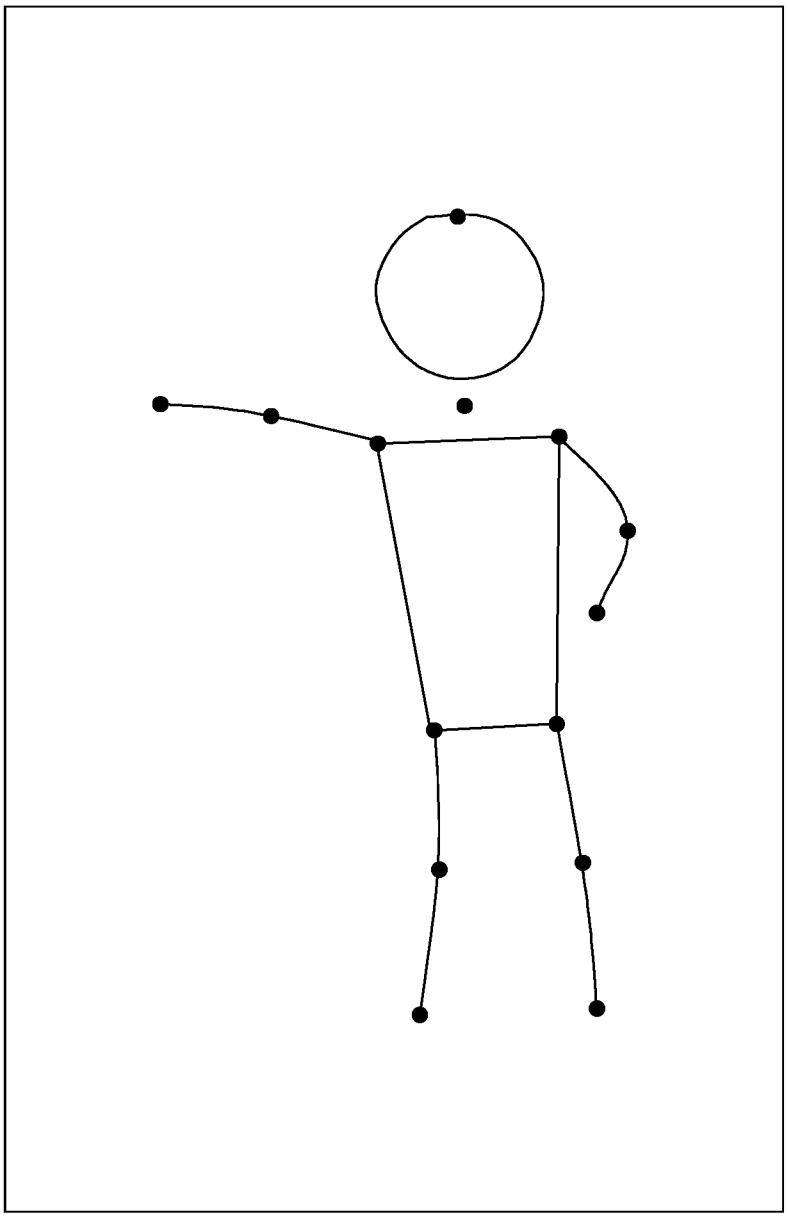
FIG. 8 is an optional schematic diagram of a cartoon character provided by an embodiment of the present disclosure.

For example, FIG. 8 is an optional schematic diagram of a cartoon character provided by an embodiment of the present disclosure. Referring to FIG. 8, the head and body of the cartoon character are consisted of lines.

In some embodiments, when determining that the body key points are not in a straight line based on the positions of the body key points of the cartoon character, the terminal connects the body key points through an arc to obtain a body in the form of an arc-shaped line whose body bending degree matches a body bending degree of the target object.

In actual implementations, judging whether the body key points are located in a straight line based on a slope of a straight line between each two key points, if so, connecting the body key points directly through a straight line; otherwise, connecting three key points through an arc to obtain the body in the form of an arc line whose body bending degree matches that of the target object.

For example, referring to FIG. 8, the three key points of the upper right limb of the cartoon character are not in a straight line, connecting the three key points through an arc to obtain an upper right limb in the form of an arc line whose bending degree matches that of the right upper limb of the target object.

In some embodiments, the terminal may present the cartoon character in the same form as the target object in the following manner: determining a relative positional relationship between the cartoon character and the target object when the cartoon character and the target object are presented in a graphical interface; and presenting the target object and the cartoon character through the same window based on the relative positional relationship.

In actual implementations, the relative positional relationship between the cartoon character and the target object may be up and down, left and right, etc., the target object and the cartoon character are presented through the same window based on the relative positional relationship. When presenting the target object and the cartoon character, the cartoon character may occupy a smaller display area relative to the target object, or the target object may occupy a smaller display area relative to the cartoon character, or the target object and the cartoon character may occupy the same size of display areas.

Figure 9:
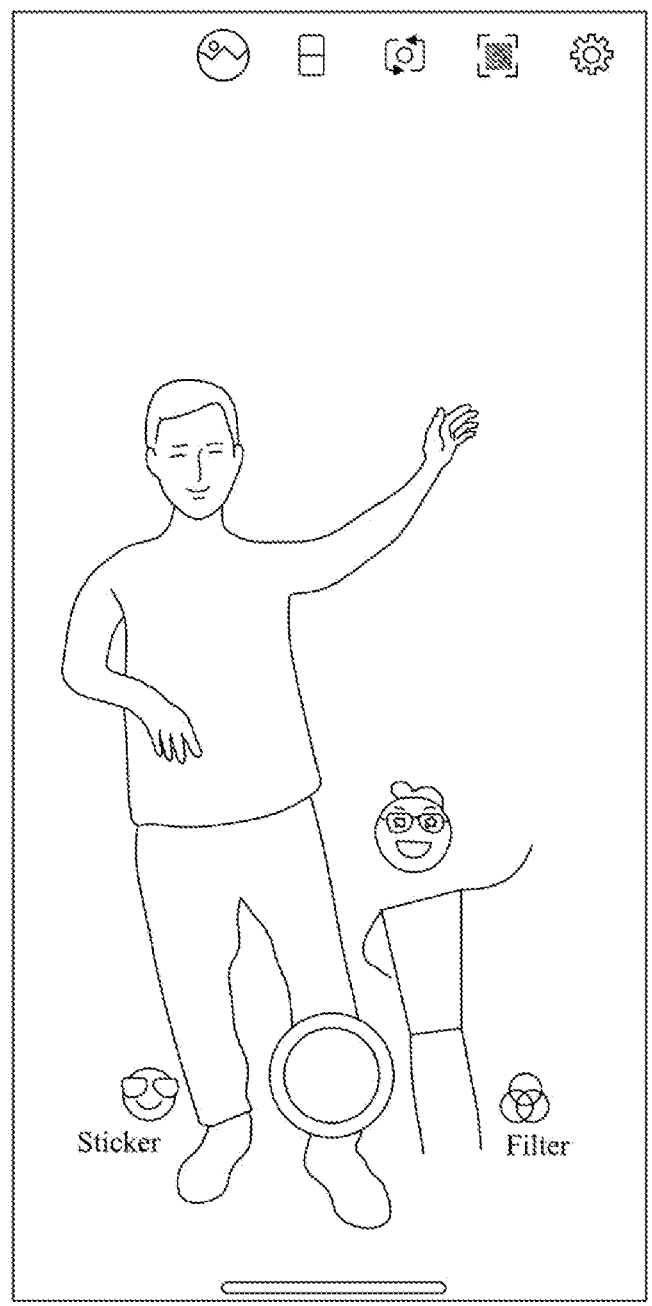
FIG. 9 is a schematic diagram of an optional graphical interface presenting a cartoon character provided by an embodiment of the present disclosure.

For example, FIG. 9 is a schematic diagram of an optional graphical interface presenting a cartoon character provided by an embodiment of the present disclosure. Referring to FIG. 9, the target object and the cartoon character are presented through the same window, where the cartoon character is displayed at the lower right of the target object, and occupies a smaller display area relative to the target object.

In some embodiments, the terminal may present the cartoon character in the same form as the target object in the following manner: respectively determining windows corresponding to the cartoon character and the target object when the cartoon character and the target object are presented in a graphical interface, where the cartoon character and the target object correspond to different windows; respectively presenting the cartoon character and the target object through a main window and a sub-window.

Here, a size of the main window is larger than that of the sub-window, and the sub-window is located on the main window.

Figure 10:
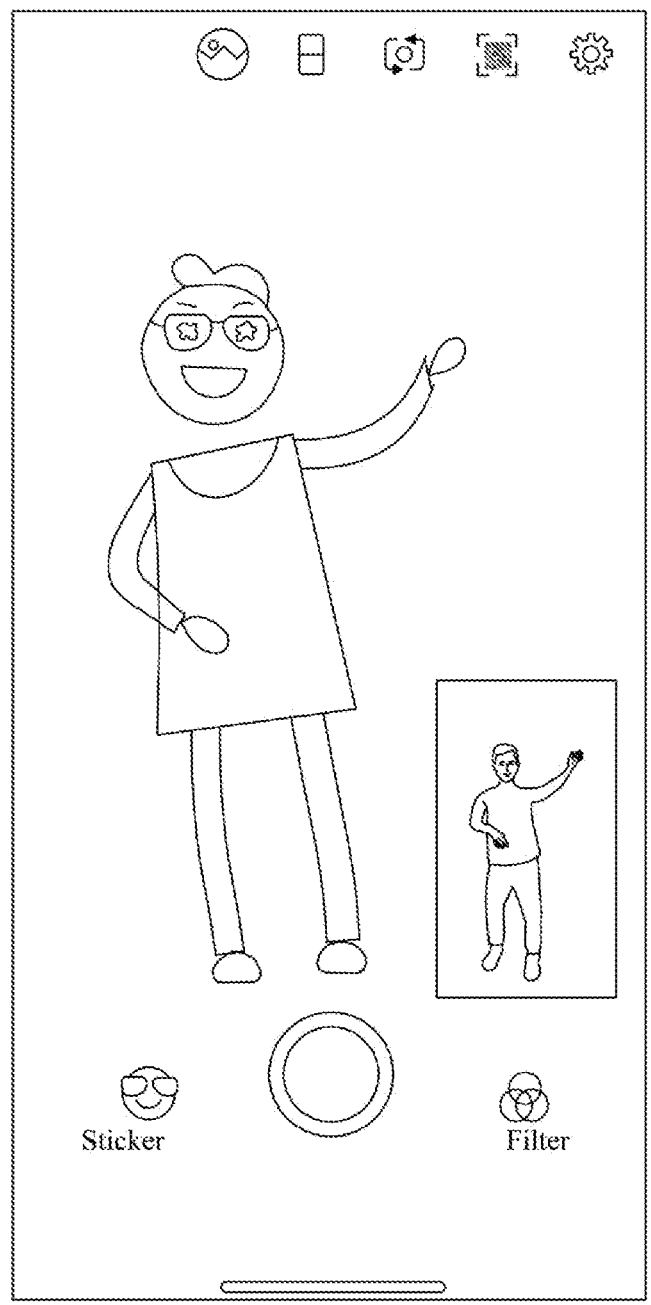
FIG. 10 is a schematic diagram of an optional graphical interface presenting a cartoon character provided by an embodiment of the present disclosure.

In some embodiments, the cartoon character is presented through a main window and the target object is presented through a sub-window. FIG. 10 is a schematic diagram of an optional graphical interface presenting a cartoon character provided by an embodiment of the present disclosure. Referring to FIG. 10, the graphical interface includes a main window and a sub-window, the sub-window is located in a lower right corner area of the main window, the cartoon character is presented through the main window, and the target object is presented through the sub-window.

Figure 11:
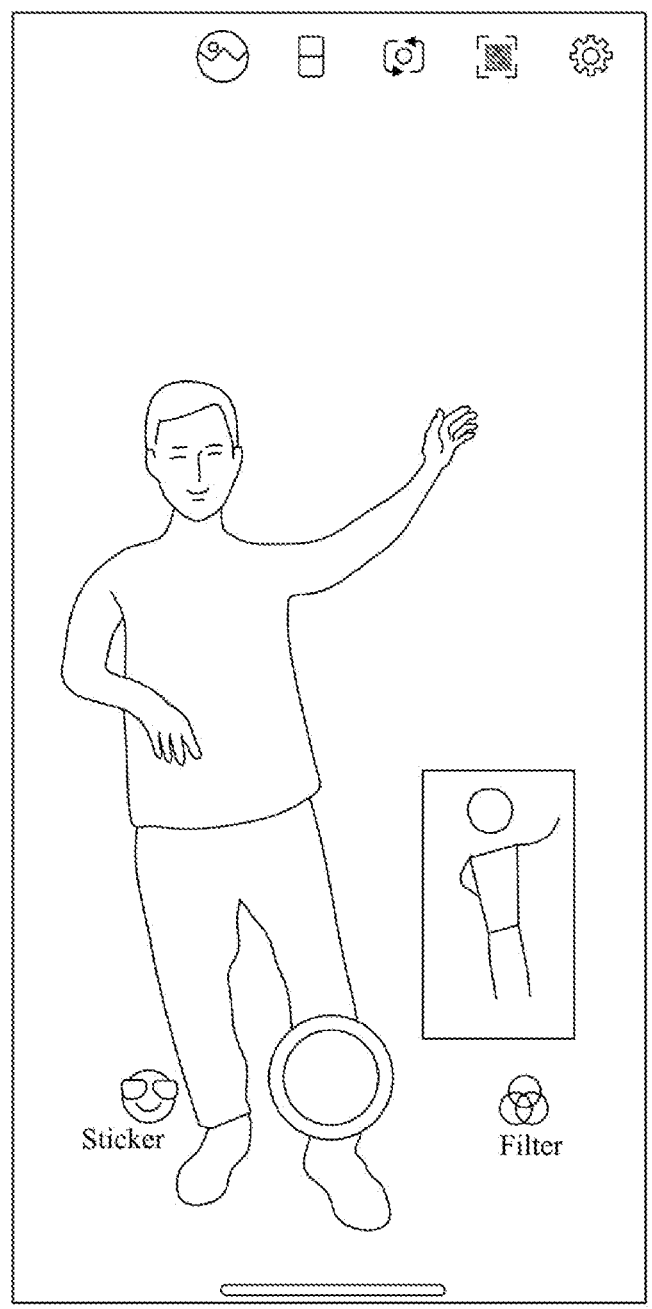
FIG. 11 is a schematic diagram of an optional graphical interface presenting a cartoon character provided by an embodiment of the present disclosure.

In some embodiments, the target object is presented through a main window and the cartoon character is presented through a sub-window. FIG. 11 is a schematic diagram of an optional graphical interface presenting a cartoon character provided by an embodiment of the present disclosure. Referring to FIG. 11, the graphical interface includes a main window and a sub-window, the sub-window is located in a lower right corner area of the main window, the target object is presented through the main window, and the cartoon character is presented through the sub-window.

Step 304: collecting a second frame image containing the target object, where the first frame image and the second frame image are consecutive frame images.

Here, the collection of images is real-time collection, and the second frame image is a continuous frame image after the first frame image.

Step 305: detecting the key points of the target object in the second frame image to obtain second position information of the key points.

Here, the terminal may detect the key points of the target object in the same manner as in Step 302.

Step 306: updating a form of the presented cartoon character based on a difference between the first position information and the second position information.

Here the morphological change of the target object may be determined based on the difference between the first position information and the second position information. By updating the form of the presented cartoon character based on the difference between the first position information and the second position information, the cartoon character is caused to perform the same action as the target object.

In some embodiments, the terminal may update the form of the presented cartoon character in the following manner: determining a position change of the key points of the cartoon character based on the difference between the first position information and the second position information; and adjusting the form of the presented cartoon character based on the position change of the key points of the cartoon character, so that the form of the updated cartoon character is as same as a form of the target object in the second frame image.

In actual implementations, it is possible to represent the change of the second position information relative to the first position information by a vector, and then determine the position change of the key points of the cartoon character according to a corresponding relationship between the two coordinate systems, and then adjust the form of the presented cartoon character based on the position change of the key points of the cartoon character.

In practical applications, when the cartoon character is composed entirely of cartoon materials, adjusting the position of each cartoon material according to the position change of the key points of the cartoon character; when the cartoon character is composed of a head material and a drawn body of the cartoon character, adjusting the position of the head material according to the position change of the key points of the cartoon character, and adjusting a bending radian and a position of the body according to the position change of the key points of the body; when the cartoon character is entirely composed of the drawn head and body of the cartoon character, adjusting a bending radian and a position of the linear body and the position of the head according to the position change of the key points of the cartoon character.

It should be stated that the terminal collects frame images containing the target object in real time, and performs the following operations for each frame image collected: detecting position information of the key points of the target object in the image, and updating the form of the presented cartoon character based on the difference from the position information of the key points of the target object in the previous frame image.

According to the embodiments of the present disclosure, first position information of key points is obtained by detecting the key points of a target object in a first frame image; a cartoon character in the same form as the target object is generated and presented based on the first position information of the key points; second position information of the key points is obtained by detecting the key points of the target object in a second frame image; and then a form of the presented cartoon character is updated based on a difference between the first position information and the second position information, thus causing the generated cartoon character to follow the target object to perform the same action as the target object in the collected image during a video shooting process, thereby providing a user with a new interactive mode and improving the user's sense of experience.

Figure 12A:
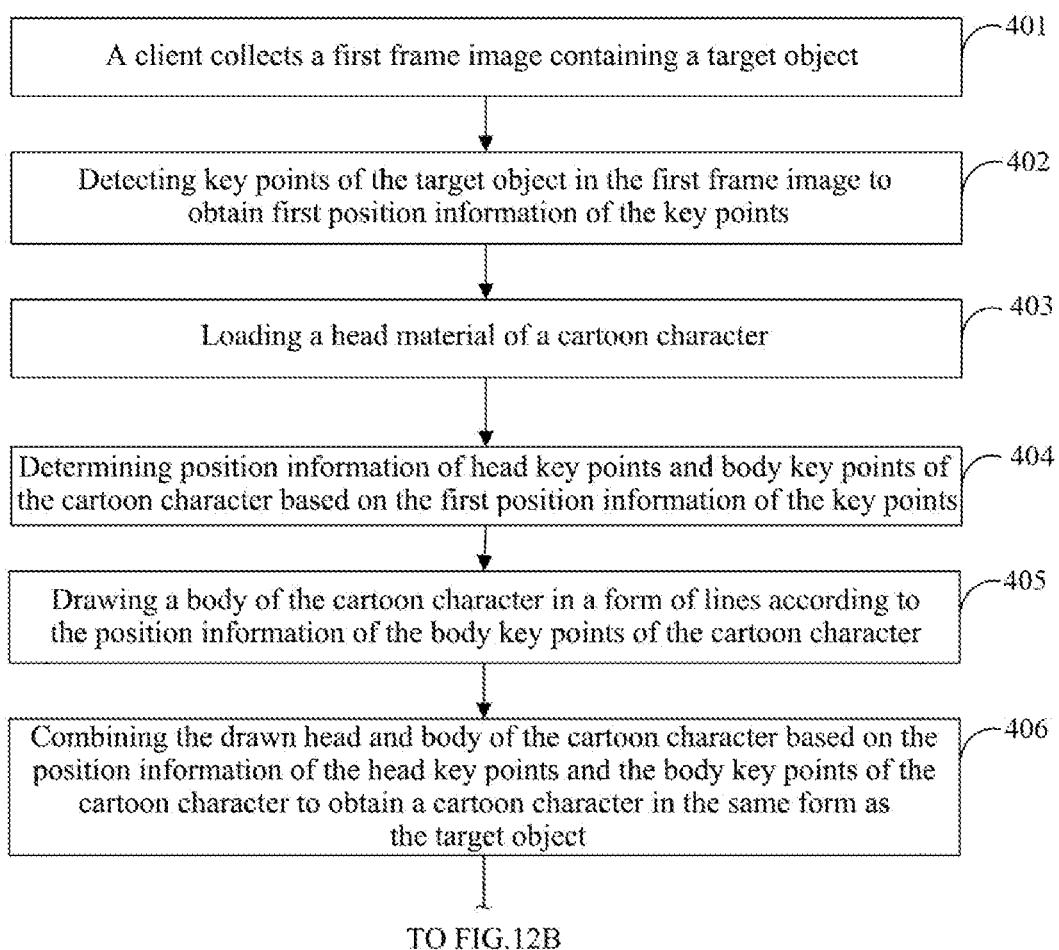
FIG. 12A and FIG. 12B are an optional flowchart of an image processing method provided by an embodiment of the present disclosure.
Figure 12B:
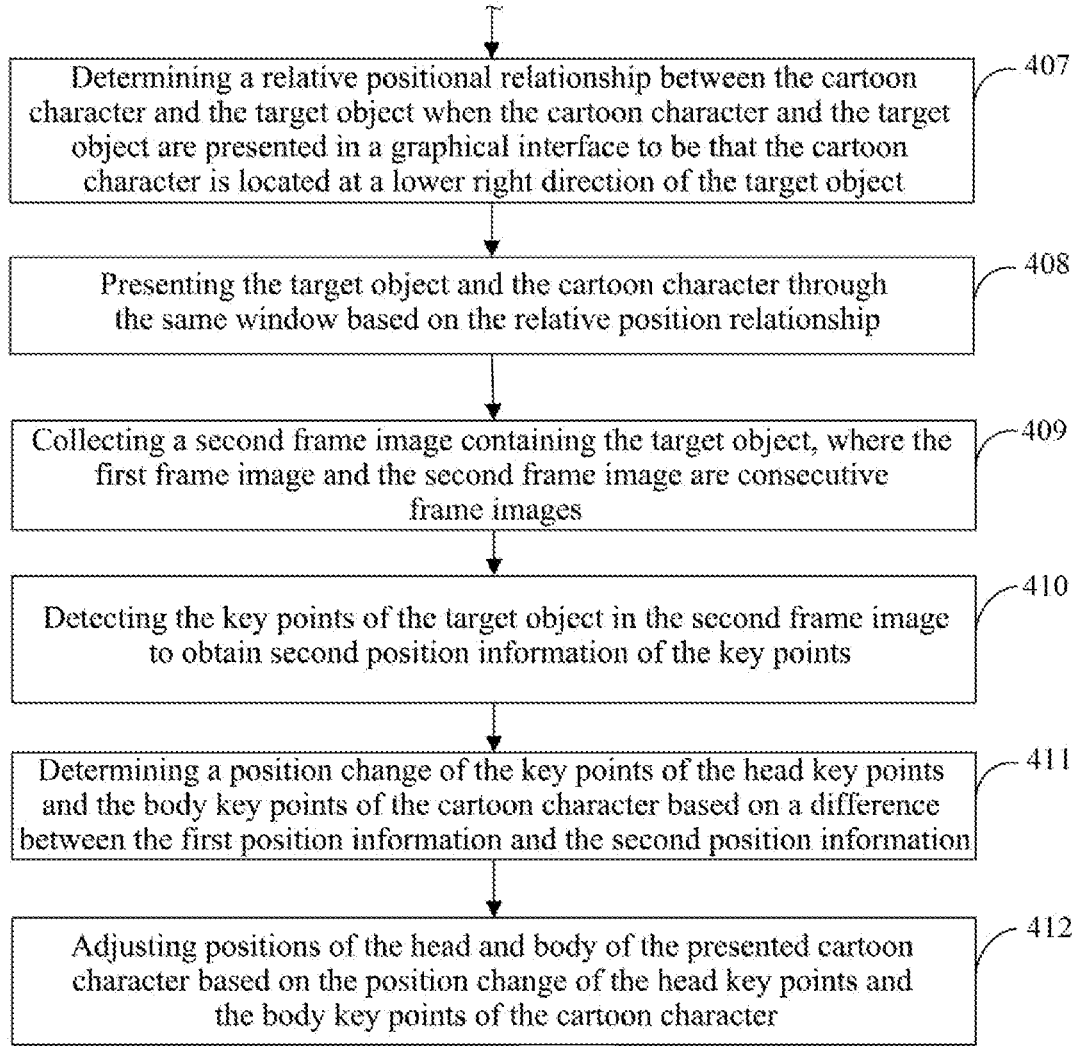

The image processing method provided by an embodiment of the present disclosure is described below by taking a loaded cartoon material including a head material as an example. FIG. 12A and FIG. 12B are an optional flowchart of an image processing method provided by an embodiment of the present disclosure. Referring to FIG. 12A and FIG. 12B, the image processing method according to the embodiment of the present disclosure includes:

Step 401: a client collects a first frame image containing a target object.

Here, in practical applications, the client may be a social network client, such as a short video client, an instant messaging client, or may also be an image processing client, such as a beauty camera client. The client collects the first frame image containing the target object by calling a camera of the terminal.

Step 402: detecting key points of the target object in the first frame image to obtain first position information of the key points.

Step 403: loading a head material of a cartoon character.

Step 404: determining position information of head key points and body key points of the cartoon character based on the first position information of the key points.

Step 405: drawing a body of the cartoon character in a form of lines according to the position information of the body key points of the cartoon character.

As illustrated in FIG. 9, the cartoon character is obtained by combining the head material and the body material, and the form of the cartoon character is as same as that of the target object.

Step 406: combining the drawn head and body of the cartoon character based on the position information of the head key points and the body key points of the cartoon character to obtain a cartoon character in the same form as the target object.

Step 407: determining a relative positional relationship between the cartoon character and the target object when the cartoon character and the target object are presented in a graphical interface to be that the cartoon character is located at a lower right direction of the target object.

Step 408: presenting the target object and the cartoon character through the same window based on the relative position relationship.

As illustrated in FIG. 9, the target object and the cartoon character are presented through the same window, the cartoon character is located at a lower right direction of the target object, and the display area of the cartoon character is smaller than that of the target object.

Step 409: collecting a second frame image containing the target object, where the first frame image and the second frame image are consecutive frame images.

Step 410: detecting the key points of the target object in the second frame image to obtain second position information of the key points.

Step 411: determining a position change of the head key points and the body key points of the cartoon character based on a difference between the first position information and the second position information.

Step 412: adjusting positions of the head and body of the presented cartoon character based on the position change of the head key points and the body key points of the cartoon character.

Here, the target object in the second frame image and the adjusted cartoon character are presented through the same window, where the adjusted cartoon character is in the same form as the target object in the second frame image.

Figure 13A:
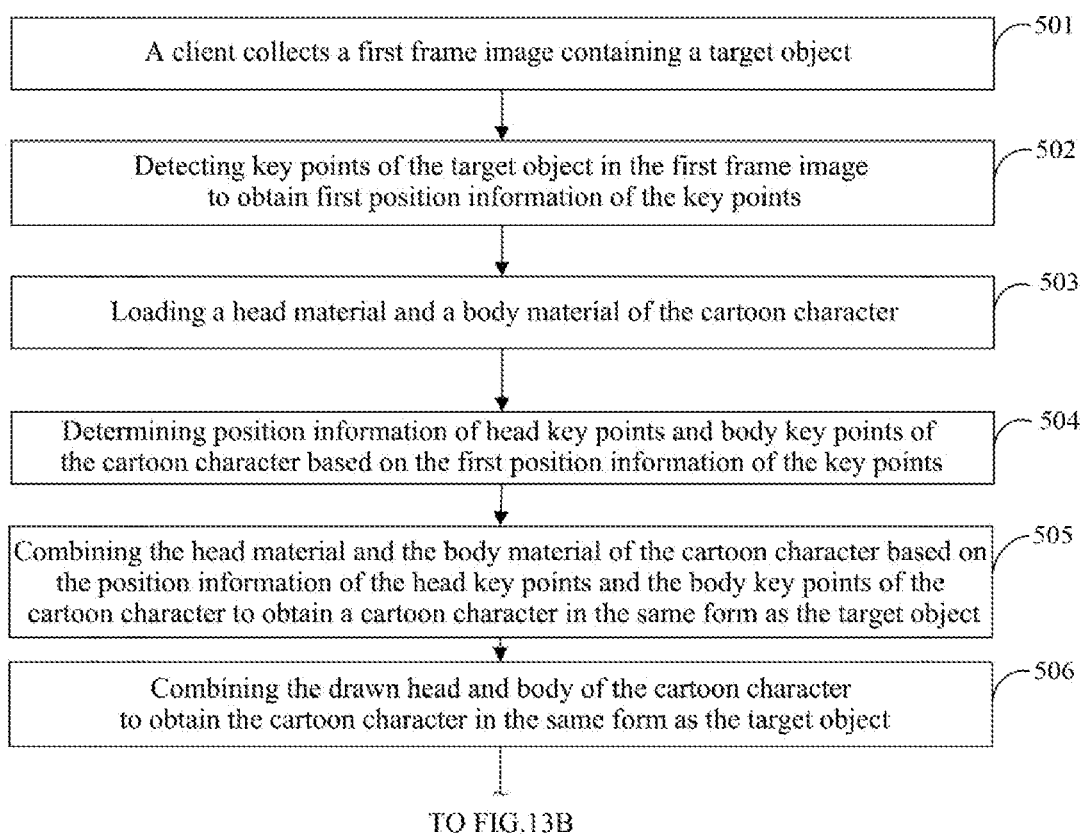
FIG. 13A and FIG. 13B are an optional flowchart of an image processing method provided by an embodiment of the present disclosure.
Figure 13B:
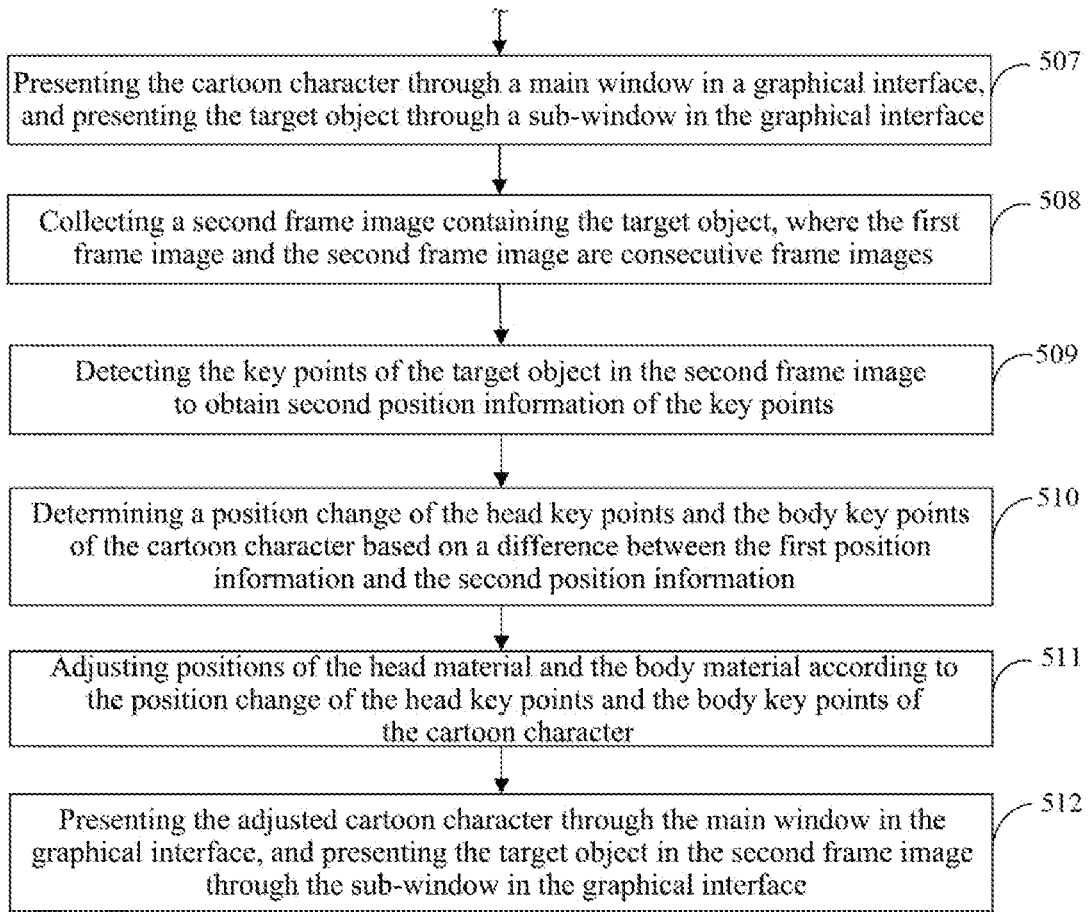

The image processing method provided by an embodiment of the present disclosure is described below by taking a cartoon material including a head material and a body material as an example. FIG. 13A and FIG. 13B are an optional flowchart of an image processing method provided by an embodiment of the present disclosure. Referring to FIG. 13A and FIG. 13B, the image processing method according to the embodiment of the present disclosure includes:

Step 501: a client collects a first frame image containing a target object.

Here, in practical applications, the client may be a social network client, such as a short video client, an instant messaging client, or may also be an image processing client, such as a beauty camera client. The client collects the first frame image containing the target object by calling a camera of the terminal.

Step 502: detecting key points of the target object in the first frame image to obtain first position information of the key points.

Step 503: loading a head material and a body material of the cartoon character.

Step 504: determining position information of head key points and body key points of the cartoon character based on the first position information of the key points.

Step 505: combining the head material and the body material of the cartoon character based on the position information of the head key points and the body key points of the cartoon character to obtain a cartoon character in the same form as the target object.

Step 506: combining the drawn head and body of the cartoon character to obtain the cartoon character in the same form as the target object.

As illustrated in FIG. 10, the cartoon character consists of the head material and the drawn body.

Step 507: presenting the cartoon character through a main window in a graphical interface, and presenting the target object through a sub-windows in the graphical interface.

As illustrated in FIG. 10, a size of the main window is larger than that of the sub-window, and the sub-window is located on the main window. The form of the cartoon character presented through the main window is as same as the form of the target object presented through the sub-window.

Step 508: collecting a second frame image containing the target object, where the first frame image and the second frame image are consecutive frame images.

Step 509: detecting the key points of the target object in the second frame image to obtain second position information of the key points.

Step 510: determining a position change of the head key points and the body key points of the cartoon character based on a difference between the first position information and the second position information.

Step 511: adjusting positions of the head material and the body material according to the position change of the head key points and the body key points of the cartoon character.

Step 512: presenting the adjusted cartoon character through the main window in the graphical interface, and presenting the target object in the second frame image through the sub-window in the graphical interface.

Figure 14A:
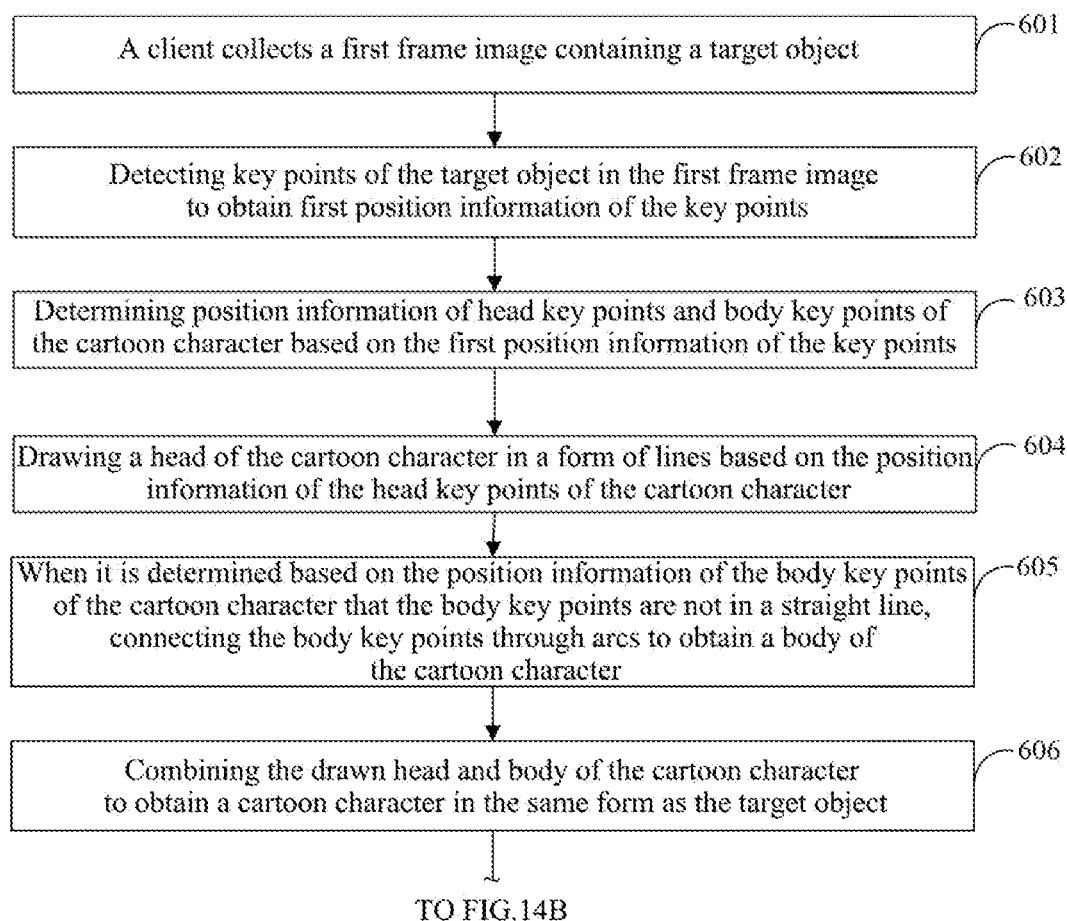
FIG. 14A and FIG. 14B are an optional flowchart of an image processing method provided by an embodiment of the present disclosure.
Figure 14B:
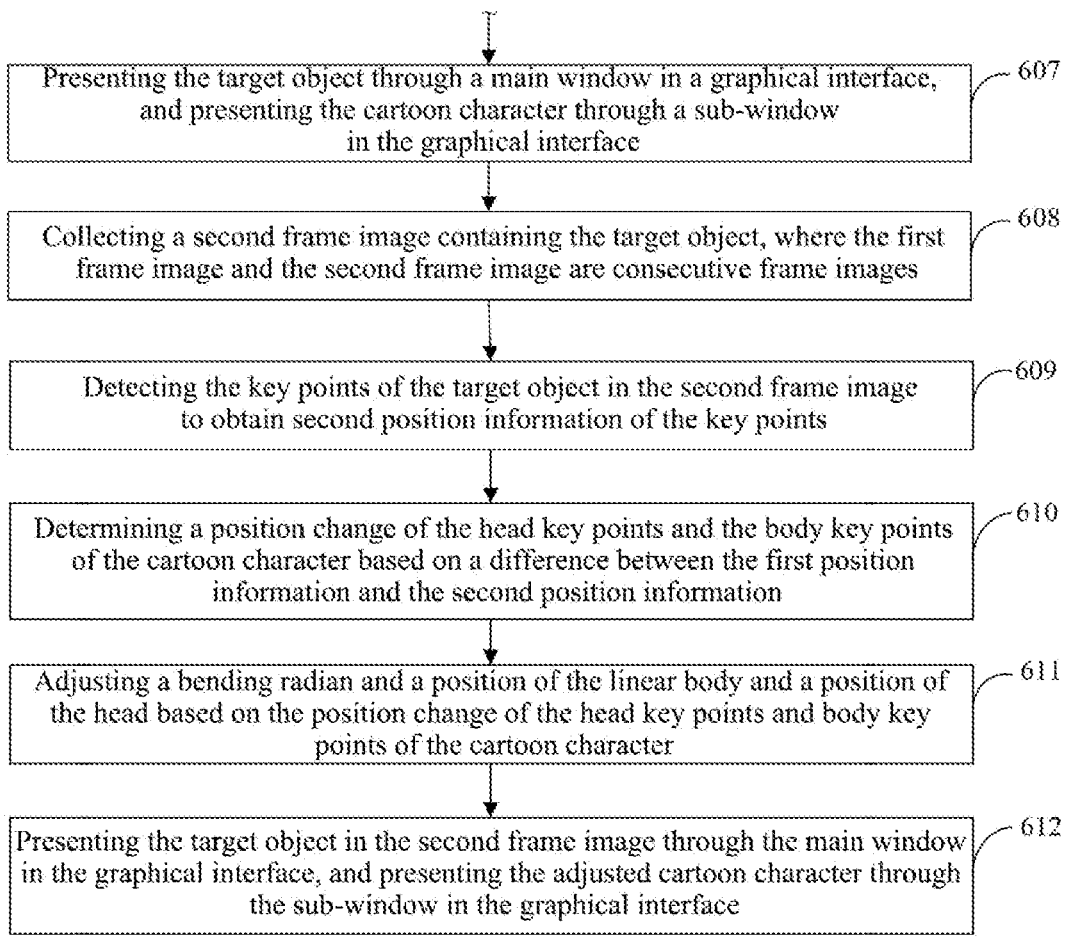

The image processing method provided by an embodiment of the present disclosure is described below by taking a cartoon character drawn in a form of lines as an example. FIG. 14A and FIG. 14B are an optional flowchart of an image processing method provided by an embodiment of the present disclosure. Referring to FIG. 14A and FIG. 14B, the image processing method according to the embodiment of the present disclosure includes:

Step 601: a client collects a first frame image containing a target object.

Here, in practical applications, the client may be a social network client, such as a short video client, an instant messaging client, or may also be an image processing client, such as a beauty camera client. The client collects the first frame image containing the target object by calling a camera of the terminal.

Step 602: detecting key points of the target object in the first frame image to obtain first position information of the key points.

Step 603: determining position information of head key points and body key points of the cartoon character based on the first position information of the key points.

Step 604: drawing a head of the cartoon character in a form of lines based on the position information of the head key points of the cartoon character.

As illustrated in FIG. 11, the head of the cartoon character is a circular line.

Step 605: when it is determined based on the position information of the body key points of the cartoon character that the body key points are not in a straight line, connecting the body key points through arcs to obtain a body of the cartoon character.

As illustrated in FIG. 11, the body of the cartoon character are composed of arcs, where bending degrees of the arc lines are as same as bending degrees of the body of the target object.

Step 606: combining the drawn head and body of the cartoon character to obtain a cartoon character in the same form as the target object.

Step 607: presenting the target object through a main window in a graphical interface, and presenting the cartoon character through a sub-window in the graphical interface.

As illustrated in FIG. 11, a size of the main window is larger than that of the sub-window, and the sub-window is located on the main window. The cartoon character presented through the sub-window is in the same form as the target object presented through the main window.

Step 608: collecting a second frame image containing the target object, where the first frame image and the second frame image are consecutive frame images.

Step 609: detecting the key points of the target object in the second frame image to obtain second position information of the key points.

Step 610: determining a position change of the head key points and the body key points of the cartoon character based on a difference between the first position information and the second position information.

Step 611: adjusting a bending radian and a position of the linear body and a position of the head based on the position change of the head key points and body key points of the cartoon character.

Step 612: presenting the target object in the second frame image through the main window in the graphical interface, and presenting the adjusted cartoon character through the sub-window in the graphical interface.

Figure 15:
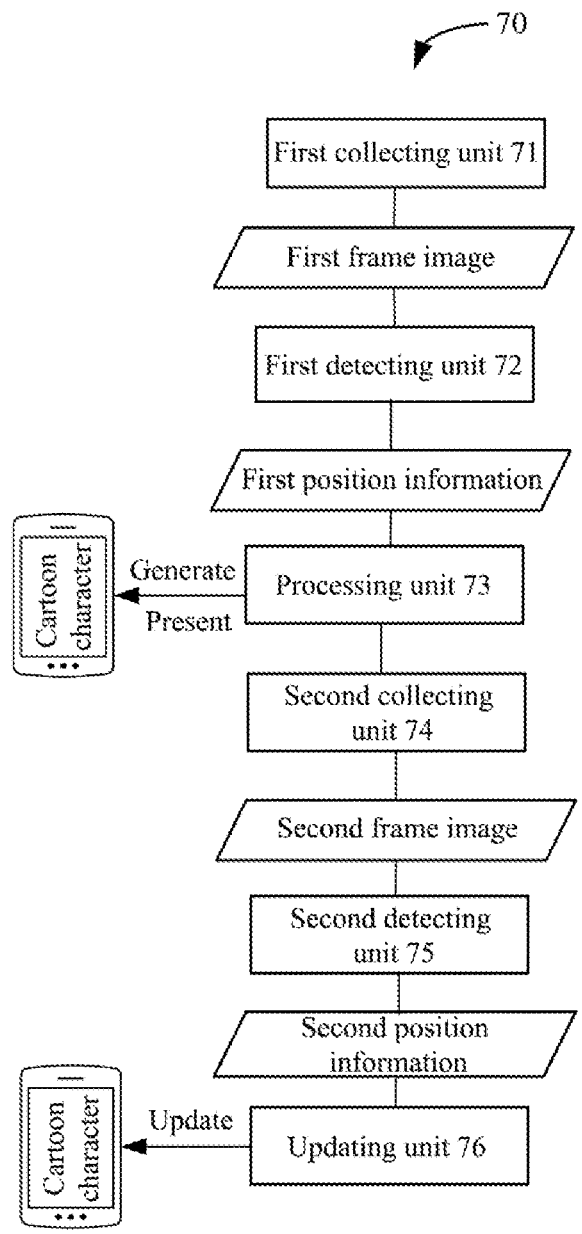
FIG. 15 is a schematic diagram of an optional composition structure of an image processing apparatus provided by an embodiment of the present disclosure.

The software implementation of an image processing apparatus provided by an embodiment of the present disclosure will be described as follows. With reference to FIG. 15, which is a schematic diagram of an optional composition structure of an image processing apparatus provided by an embodiment of the present disclosure, with reference to FIG. 15, the image processing apparatus 70 according to the embodiment of the present disclosure includes:

a first collecting unit 71, configured to collect a first frame image containing a target object;

a first detecting unit 72, configured to detect key points of the target object in the first frame image to obtain first position information of the key points;

a processing unit 73, configured to generate and present a cartoon character in a same form as the target object based on the first position information of the key points;

a second collecting unit 74, configured to collect a second frame image containing the target object, where the first frame image and the second frame image are consecutive frame images;

a second detecting unit 75, configured to detect the key points of the target object in the second frame image to obtain second position information of the key points; and an updating unit 76 which updates a form of the presented cartoon character based on a difference between the first position information and the second position information.

In some embodiments, the processing unit 73 is further configured to:

load a cartoon material, where the cartoon material includes at least one of a head material, a body material, and an apparel material of the cartoon character;

determining position information of head key points and body key points of the cartoon character based on the first position information of the key points; and generating the cartoon character in the same form as the target object based on the position information of the head key points and the body key points of the cartoon character, and the cartoon material.

In some embodiments, the processing unit 73 is further configured to, when the cartoon material includes the head material and the body material of the cartoon character, combine the head material and the body material according to the position information of the head key points and the body key points of the cartoon character to obtain the cartoon character.

In some embodiments, the processing unit 73 is further configured to, when the cartoon material includes the head material the cartoon character, draw body of the cartoon character in a form of lines based on the position information of the body key points of the cartoon character; and combine the head material and the drawn body of the cartoon character to obtain the cartoon character in the same form as the target object.

In some embodiments, the processing unit 73 is further configured to determine position information of head key points and body key points of the cartoon character based on the first position information of the key points;

drawing a head of the cartoon character in a form of lines based on the position information of the head key points of the cartoon character;

drawing a body of the cartoon character in the form of lines based on the position information of the body key points of the cartoon character; and combining the drawn head and body of the cartoon character to obtain the cartoon character in the same form as the target object.

In some embodiments, the processing unit 73 is further configured to, when it is determined based on positions of the body key points of the cartoon character that the body key points are not in a straight line, connect the body key points through an arc to obtain a body in a form of an arc-shaped line whose body bending degree matches a body bending degree of the target object.

In some embodiments, the processing unit 73 is further configured to:

determine a relative positional relationship between the cartoon character and the target object when the cartoon character and the target object are presented in a graphical interface; and present the target object and the cartoon character through a same window based on the relative position relationship.

In some embodiments, the processing unit 73 is further configured to:

respectively determine windows corresponding to the cartoon character and the target object when the cartoon character and the target object are presented in a graphical interface, where the cartoon character and the target object correspond to different windows; and respectively present the cartoon character and the target object through a main window and a sub-window.

In some embodiments, the updating unit 76 is further configured to:

determine a position change of the key points of the cartoon character based on the difference between the first position information and the second position information; and adjust the form of the presented cartoon character based on the position change of the key points of the cartoon character, so that the updated form of the cartoon character is as same as a form of the target object in the second frame image.

An image processing method is provided according to one or more embodiments of the present disclosure, including:

collecting a first frame image containing a target object;

detecting key points of the target object in the first frame image to obtain first position information of the key points;

generating and presenting a cartoon character in a same form as the target object based on the first position information of the key points;

collecting a second frame image containing the target object, where the first frame image and the second frame image are consecutive frame images;

detecting the key points of the target object in the second frame image to obtain second position information of the key points; and updating a form of the presented cartoon character based on a difference between the first position information and the second position information.

The above image processing method is provided according to one or more embodiments of the present disclosure, where the generating the cartoon character in the same form as the target object based on the first position information of the key points includes:

loading a cartoon material, where the cartoon material includes at least one of a head material, a body material, and an apparel material of the cartoon character;

determining position information of head key points and body key points of the cartoon character based on the first position information of the key points; and generating the cartoon character in the same form as the target object based on the position information of the head key points and the body key points of the cartoon character, and the cartoon material.

The above image processing method is provided according to one or more embodiments of the present disclosure, where the generating the cartoon character in the same form as the target object based on the position information of the head key points and the body key points of the cartoon character, and the cartoon material includes:

when the cartoon material includes the head material and the body material of the cartoon character, combining the head material and the body material according to the position information of the head key points and the body key points of the cartoon character to obtain the cartoon character.

The above image processing method is provided according to one or more embodiments of the present disclosure, where the generating the cartoon character in the same form as the target object based on the first position information of the key points includes:

determining position information of head key points and body key points of the cartoon character based on the first position information of the key points;

drawing a head of the cartoon character in a form of lines based on the position information of the head key points of the cartoon character;

drawing a body of the cartoon character in the form of lines based on the position information of the body key points of the cartoon character; and combining the drawn head and body of the cartoon character to obtain the cartoon character in the same form as the target object.

The above image processing method is provided according to one or more embodiments of the present disclosure, where the drawing the body of the cartoon character in the form of lines includes:

when it is determined based on positions of the body key points of the cartoon character that the body key points are not in a straight line, connecting the body key points through an arc to obtain a body in a form of an arc-shaped line whose body bending degree matches a body bending degree of the target object.

The above image processing method is provided according to one or more embodiments of the present disclosure, where the presenting the cartoon character in the same form as the target object includes:

determining a relative positional relationship between the cartoon character and the target object when the cartoon character and the target object are presented in a graphical interface; and presenting the target object and the cartoon character through a same window based on the relative position relationship.

The above image processing method is provided according to one or more embodiments of the present disclosure, where the presenting the cartoon character in the same form as the target object includes:

respectively determining windows corresponding to the cartoon character and the target object when the cartoon character and the target object are presented in a graphical interface, where the cartoon character and the target object correspond to different windows; and respectively presenting the cartoon character and the target object through a main window and a sub-window.

The above image processing method is provided according to one or more embodiments of the present disclosure, where the updating the form of the presented cartoon character based on the difference between the first position information and the second position information includes:

determining a position change of the key points of the cartoon character based on the difference between the first position information and the second position information; and adjusting the form of the presented cartoon character based on the position change of the key points of the cartoon character, so that the updated form of the cartoon character is as same as a form of the target object in the second frame image.

An image processing apparatus is provided according to one or more embodiments of the present disclosure, including:

a first collecting unit, configured to collect a first frame image containing a target object;

a first detecting unit, configured to detect key points of the target object in the first frame image to obtain first position information of the key points;

a processing unit, configured to generate and present a cartoon character in a same form as the target object based on the first position information of the key points;

a second collecting unit, configured to collect a second frame image containing the target object, where the first frame image and the second frame image are consecutive frame images;

a second detecting unit, configured to detect the key points of the target object in the second frame image to obtain second position information of the key points; and an updating unit which updates a form of the presented cartoon character based on a difference between the first position information and the second position information.

An electronic device is provided according to one or more embodiments of the present disclosure, including:

a memory, configured to store executable instructions; and a processor, configured to implement the image processing method provided in the embodiments of the present disclosure when executing the executable instructions.

A storage medium is provided according to one or more embodiments of the present disclosure, the storage medium stores executable instructions which, when executed, are configured to implement the image processing method provided by the embodiments of the present disclosure.

The above description is merely embodiments of the present disclosure and explanations of the technical principles employed. Those skilled in the art should understand that the scope of disclosure involved in the present disclosure is not limited to the technical solutions formed by the specific combination of the above technical features, and should also cover, without departing from the above disclosed concept, other technical solutions formed by any combination of the above technical features or their equivalent features. For example, a technical solution formed by replacing the above features with technical features that have similar functions to those disclosed in the present disclosure (but not limited to).

Additionally, although each operation is depicted in a particular order, which should not be understood as requiring that the operations should be performed in the particular order shown or in a sequential order. Multitask and parallel processing may be advantageous under certain circumstances. Likewise, although the above discussion contains several specific implementation details, those should not be construed as limitations on the scope of the present disclosure. Certain features described in the context of separate embodiments may also be implemented in combination in a single embodiment. Conversely, various features described in the context of a single embodiment may also be implemented in multiple embodiments separately or in any suitable sub-combination.

Although the subject matter has been described in language specific to structural features and/or method logic actions, it should be understood that the subject matter defined in the appended claims is not necessarily limited to the specific features or actions described above. Rather, the specific features and actions described above are merely example forms for implementing the claims.

What is claimed is:

1. An image processing method, wherein the method comprises:

collecting a first frame image containing a target object;

detecting key points of the target object in the first frame image to obtain first position information of the key points;

generating and presenting a cartoon character in a same form as the target object based on the first position information of the key points;

collecting a second frame image containing the target object, wherein the first frame image and the second frame image are consecutive frame images;

detecting the key points of the target object in the second frame image to obtain second position information of the key points; and updating a form of the presented cartoon character based on a difference between the first position information and the second position information;

the generating the cartoon character in the same form as the target object based on the first position information of the key points comprises:

determining position information of head key points and body key points of the cartoon character based on the first position information of the key points;

when a cartoon material is loaded, under a condition that the loaded cartoon material comprises a head material and a body material of the cartoon character, generating the cartoon character in the same form as the target object based on the loaded cartoon material and the position information of the head key points and the body key points of the cartoon character;

under a condition that the loaded cartoon material lacks a part of the cartoon character, drawing the lacked part of the cartoon character in a form of lines based on position information corresponding to the lacked part in the position information of the head key points and the body key points of the cartoon character, and generating the cartoon character in the same form as the target object based on the drawn part and the loaded cartoon material, wherein the lacked part of the cartoon character comprises a head or a body of the cartoon character;

when no cartoon material is loaded, drawing the head and the body of the cartoon character in a form of lines based on the position information of the head key points and the body key points of the cartoon character, and generating the cartoon character in the same form as the target object based on the drawn head and the drawn body of the cartoon character.

2. The method according to claim 1, wherein the generating the cartoon character in the same form as the target object based on the loaded cartoon material and the position information of the head key points and the body key points of the cartoon character comprises:

combining the head material and the body material according to the position information of the head key points and the body key points of the cartoon character to obtain the cartoon character.

3. The method according to claim 1, wherein the lacked part is the body of the cartoon character, the drawing the lacked part of the cartoon character in the form of lines based on the position information corresponding to the lacked part in the position information of the head key points and the body key points of the cartoon character, and generating the cartoon character in the same form as the target object based on the drawn part and the loaded cartoon material comprises:

drawing the body of the cartoon character in the form of lines based on the position information of the body key points of the cartoon character; and combining a head material of the cartoon character and the drawn body of the cartoon character to obtain the cartoon character in the same form as the target object.

4. The method according to claim 1, wherein the drawing the head and the body of the cartoon character in the form of lines based on the position information of the head key points and the body key points of the cartoon character, and generating the cartoon character in the same form as the target object based on the drawn head and the drawn body of the cartoon character comprises:

drawing the head of the cartoon character in the form of lines based on the position information of the head key points of the cartoon character;

drawing the body of the cartoon character in the form of lines based on the position information of the body key points of the cartoon character; and combining the drawn head and body of the cartoon character to obtain the cartoon character in the same form as the target object.

5. The method according to claim 4, wherein the drawing the body of the cartoon character in the form of lines comprises:

when it is determined based on positions of the body key points of the cartoon character that the body key points are not in a straight line, connecting the body key points through an arc to obtain a body in a form of an arc-shaped line whose body bending degree matches a body bending degree of the target object.

6. The method according to claim 1, wherein the presenting the cartoon character in the same form as the target object comprises:

determining a relative positional relationship between the cartoon character and the target object when the cartoon character and the target object are presented in a graphical interface; and presenting the target object and the cartoon character through a same window based on the relative position relationship.

7. The method according to claim 1, wherein the presenting the cartoon character in the same form as the target object comprises:

respectively determining windows corresponding to the cartoon character and the target object when the cartoon character and the target object are presented in a graphical interface, wherein the cartoon character and the target object correspond to different windows; and respectively presenting the cartoon character and the target object through a main window and a sub-window.

8. The method according to claim 1, wherein the updating the form of the presented cartoon character based on the difference between the first position information and the second position information comprises:

determining a position change of the key points of the cartoon character based on the difference between the first position information and the second position information; and adjusting the form of the presented cartoon character based on the position change of the key points of the cartoon character, so that the updated form of the cartoon character is as same as a form of the target object in the second frame image.

9. The method according to claim 8, wherein the adjusting the form of the presented cartoon character based on the position change of the key points of the cartoon character comprises:

when the cartoon character is generated based on the drawn head and the drawn body of the cartoon character, adjusting a position of the drawn head of the cartoon character according to the position change of the head key points and adjusting a bending radian and a position of the drawn body of the cartoon character according to the position change of the body key points.

10. An image processing apparatus, wherein the apparatus comprises:

a processor and a memory, wherein the memory is configured to store a computer program, and the processor is configured to call and run the computer program stored in the memory to:

collect a first frame image containing a target object;

detect key points of the target object in the first frame image to obtain first position information of the key points;

generate and present a cartoon character in a same form as the target object based on the first position information of the key points;

collect a second frame image containing the target object, wherein the first frame image and the second frame image are consecutive frame images;

detect the key points of the target object in the second frame image to obtain second position information of the key points; and update a form of the presented cartoon character based on a difference between the first position information and the second position information, the processor is further configured to:

determine position information of head key points and body key points of the cartoon character based on the first position information of the key points;

when a cartoon material is loaded, under a condition that the loaded cartoon material comprises a head material and a body material of the cartoon character, generate the cartoon character in the same form as the target object based on the loaded cartoon material and the position information of the head key points and the body key points of the cartoon character;

under a condition that the loaded cartoon material lacks a part of the cartoon character, draw the lacked part of the cartoon character in a form of lines based on position information corresponding to the lacked part in the position information of the head key points and the body key points of the cartoon character, and generate the cartoon character in the same form as the target object based on the drawn part and the loaded cartoon material, wherein the lacked part of the cartoon character comprises a head or a body of the cartoon character;

when no cartoon material is loaded, draw the head and the body of the cartoon character in a form of lines based on the position information of the head key points and the body key points of the cartoon character, and generate the cartoon character in the same form as the target object based on the drawn head and the drawn body of the cartoon character.

11. The apparatus according to claim 10, wherein the processor is further configured to:
- combine the head material and the body material according to the position information of the head key points and the body key points of the cartoon character to obtain the cartoon character.

12. The apparatus according to claim 10, wherein the lacked part is the body of the cartoon character, and the processor is further configured to:
- draw the body of the cartoon character in the form of lines based on the position information of the body key points of the cartoon character; and
- combine a head material of the cartoon character and the drawn body of the cartoon character to obtain the cartoon character in the same form as the target object.

13. The apparatus according to claim 10, wherein the processor is further configured to:
- draw the head of the cartoon character in the form of lines based on the position information of the head key points of the cartoon character;
- draw the body of the cartoon character in the form of lines based on the position information of the body key points of the cartoon character; and
- combine the drawn head and body of the cartoon character to obtain the cartoon character in the same form as the target object.

14. The apparatus according to claim 13, wherein the processor is further configured to:
- when it is determined based on positions of the body key points of the cartoon character that the body key points are not in a straight line, connect the body key points through an arc to obtain a body in a form of an arc-shaped line whose body bending degree matches a body bending degree of the target object.

15. The apparatus according to claim 10, wherein the processor is further configured to:
- determine a relative positional relationship between the cartoon character and the target object when the cartoon character and the target object are presented in a graphical interface; and
- present the target object and the cartoon character through a same window based on the relative position relationship.

16. The apparatus according to claim 10, wherein the processor is further configured to:
- respectively determine windows corresponding to the cartoon character and the target object when the cartoon character and the target object are presented in a graphical interface, wherein the cartoon character and the target object correspond to different windows; and
- respectively present the cartoon character and the target object through a main window and a sub-window.

17. The apparatus according to claim 10, wherein the processor is further configured to:
- determine a position change of the key points of the cartoon character based on the difference between the first position information and the second position information; and
- adjust the form of the presented cartoon character based on the position change of the key points of the cartoon character, so that the updated form of the cartoon character is as same as a form of the target object in the second frame image.

18. The apparatus according to claim 17, wherein, the processor is further configured to:
- when the cartoon character is generated based on the drawn head and the drawn body of the cartoon character, adjust a position of the drawn head of the cartoon character according to the position change of the head key points and adjust a bending radian and a position of the drawn body of the cartoon character according to the position change of the body key points.

19. A non-transitory storage medium storing executable instructions, the executable instructions being used to implement an image processing method, the image processing method comprising:
- collecting a first frame image containing a target object;
- detecting key points of the target object in the first frame image to obtain first position information of the key points;
- generating and presenting a cartoon character in a same form as the target object based on the first position information of the key points;
- collecting a second frame image containing the target object, wherein the first frame image and the second frame image are consecutive frame images;
- detecting the key points of the target object in the second frame image to obtain second position information of the key points; and
- updating a form of the presented cartoon character based on a difference between the first position information and the second position information,
- the generating the cartoon character in the same form as the target object based on the first position information of the key points comprises:
- determining position information of head key points and body key points of the cartoon character based on the first position information of the key points;
- when a cartoon material is loaded,
  - under a condition that the loaded cartoon material comprises a head material and a body material of the cartoon character, generating the cartoon character in the same form as the target object based on the loaded cartoon material and the position information of the head key points and the body key points of the cartoon character;
  - under a condition that the loaded cartoon material lacks a part of the cartoon character, drawing the lacked part of the cartoon character in a form of lines based on position information corresponding to the lacked part in the position information of the head key points and the body key points of the cartoon character, and generating the cartoon character in the same form as the target object based on the drawn part and the loaded cartoon material, wherein the lacked part of the cartoon character comprises a head or a body of the cartoon character;
- when no cartoon material is loaded,
- drawing the head and the body of the cartoon character in a form of lines based on the position information of the head key points and the body key points of the cartoon character, and generating the cartoon character in the same form as the target object based on the drawn head and the drawn body of the cartoon character.

* * * * *